United States Patent
Kamohara et al.

(10) Patent No.: US 7,590,664 B2
(45) Date of Patent: Sep. 15, 2009

(54) STORAGE SYSTEM AND STORAGE SYSTEM DATA MIGRATION METHOD

(75) Inventors: Toshiki Kamohara, Odawara (JP); Eiichi Sato, Hiratsuka (JP); Masafumi Nozawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 787 days.

(21) Appl. No.: 11/205,216

(22) Filed: Aug. 17, 2005

(65) Prior Publication Data
US 2006/0288048 A1 Dec. 21, 2006

(30) Foreign Application Priority Data
Jun. 15, 2005 (JP) .............................. 2005-174653

(51) Int. Cl.
*G06F 17/30* (2006.01)
(52) U.S. Cl. ........................... 707/200; 707/204; 707/6
(58) Field of Classification Search ................. 707/200
See application file for complete search history.

(56) References Cited

U.S. PATENT DOCUMENTS

| | | | | |
|---|---|---|---|---|
| 6,701,393 | B1 * | 3/2004 | Kemeny et al. | 710/40 |
| 7,039,012 | B2 * | 5/2006 | Nakano et al. | 370/230 |
| 7,039,662 | B2 * | 5/2006 | Kano et al. | 707/204 |
| 7,392,234 | B2 * | 6/2008 | Shaath et al. | 707/1 |
| 2004/0162940 | A1 * | 8/2004 | Yagisawa et al. | 711/114 |
| 2005/0055402 | A1 * | 3/2005 | Sato | 709/205 |
| 2005/0120188 | A1 * | 6/2005 | Kuwabara et al. | 711/159 |
| 2005/0198451 | A1 * | 9/2005 | Kano et al. | 711/162 |
| 2005/0216591 | A1 * | 9/2005 | Sato | 709/226 |

FOREIGN PATENT DOCUMENTS

| | | |
|---|---|---|
| JP | 2004-70403 | 3/2004 |
| JP | 2004-295457 | 10/2004 |

* cited by examiner

*Primary Examiner*—Don Wong
*Assistant Examiner*—Binh V Ho
(74) *Attorney, Agent, or Firm*—Antonelli, Terry, Stout & Kraus, LLP.

(57) ABSTRACT

This storage system collectively manages a plurality of types of file groups reaching storage time limit, and carries out data migration spanning a plurality of storage devices. Based on the respective file information, of the respective files distributed among the respective volumes, files, whose storage time limit arrives within a prescribed period of time, are grouped together as a migration group. The storage term of the group is made to coincide with the file having the most distant storage time limit of the respective files. A first migration is carried out on the basis of the priority of the respective storage devices. A second migration is executed on the basis of the device life of the respective storage devices and the storage term of the group.

1 Claim, 26 Drawing Sheets

MAPPING TABLE (T1)

| LUN# | LDEV(LU) # | LDEV(LU) MAX SLOT NO. | VDEV # | VDEV MAX SLOT NO. | DEVICE TYPE | PATH INFORMATION |
|---|---|---|---|---|---|---|
| 1 | 1 | 10000 | 1 | 50000 | FC | INTERNAL PATH INFORMATION |
| 2 | 2 | 40000 | | | | |
| 3 | 3 | 50000 | 2 | 50000 | SATA | WWN,LUN |
| 4 | 4 | 50000 | 3 | 50000 | ATA | WWN,LUN |

MIGRATION MANAGEMENT DATABASE (34)
- POOL MANAGEMENT TABLE — 34A
- STORAGE TERM TABLE — 34B
- GROUP MANAGEMENT TABLE — 34C
- GROUP CONFIGURATION TABLE — 34D
- MIGRATION LOG TABLE — 34E
- ADDRESS CONVERSION TABLE — 34F

FIG. 7A

POOL MANAGEMENT TABLE — 34A

| DEVICE ID | PRECEDENCE RANKING | INSTALLATION DATE | DEVICE LIFE | THRESHOLD VALUE | LU# | SIZE |
|---|---|---|---|---|---|---|
| SID01 | 1 | DECEMBER 2001 | 5 YEARS | 80% | 100 | 10GB |
| SID01 | 1 | DECEMBER 2001 | 5 YEARS | 80% | 101 | 10GB |
| SID01 | 1 | DECEMBER 2001 | 5 YEARS | 80% | 102 | 10GB |
| ... | ... | ... | ... | ... | ... | ... |
| SID02 | 2 | MAY 1999 | 7 YEARS | 90% | 200 | 5GB |
| SID02 | 2 | MAY 1999 | 7 YEARS | 90% | 201 | 10GB |
| ... | ... | ... | ... | ... | ... | ... |
| SID03 | 3 | MAY 2000 | 5 YEARS | 85% | 300 | 10GB |
| ... | ... | ... | ... | ... | ... | ... |

FIG. 7B

STORAGE TERM TABLE — 34B

| DEVICE ID | LU# | SIZE | STORAGE TERM |
|---|---|---|---|
| SID01 | 10 | 100GB | 5 YEARS |
| SID01 | 11 | 50GB | 7 YEARS |
| SID01 | 12 | 20GB | 10 YEARS |
| ... | ... | ... | ... |
| SID02 | 20 | 10GB | 5 YEARS |
| SID02 | 21 | 10GB | 3 YEARS |
| ... | ... | ... | ... |

FIG. 8

GROUP MANAGEMENT TABLE (34C)

| GROUP ID | STORAGE TIME LIMIT | SIZE |
|---|---|---|
| GID01 | JUNE 1, 2010 | 55GB |
| GID02 | NOVEMBER 15, 2022 | 30GB |
| ... | ... | ... |

GROUP CONFIGURATION TABLE (34D)

| GROUP ID | FILE NAME | FILE ADDRESS | FILE CREATION DATE | LAST ACCESS DATE | MIGRATION ID |
|---|---|---|---|---|---|
| GID01 | FN01 | ADR01 | MAY 31, 2005 | MAY 31, 2005 | MID01 |
| GID01 | FN02 | ADR02 | MAY 31, 2005 | JUNE 1, 2005 | MID02 |
| GID01 | FN03 | ADR03 | JUNE 1. 2005 | JUNE 1. 2005 | MID03 |
| ... | ... | ... | ... | ... | ... |
| GID02 | FN011 | ADR11 | DECEMBER 11, 2004 | FEBRUARY 7, 2005 | MID11 |
| ... | ... | ... | ... | ... | ... |

FIG. 9

MIGRATION LOG TABLE 34E

| MIGRATION ID (BEFORE EXECUTION) | GROUP ID | MIGRATION EXECUTION DATE/TIME | MIGRATION END DATE/TIME | MIGRATION SOURCE LU# | MIGRATION DESTINATION LU# | MIGRATION ID (AFTER EXECUTION) |
|---|---|---|---|---|---|---|
| MID21 | GID11 | yymmdd 23:00:00 | yymmdd 01:15:24 | MIGRATION SOURCE LU10 | MIGRATION DESTINATION LU200 | MID51 |
| MID22 | GID12 | yymmdd 03:00:00 | yymmdd 06:07:15 | MIGRATION SOURCE LU11 | MIGRATION DESTINATION LU201 | MID52 |
| ... | ... | ... | ... | ... | ... | ... |

FIG. 10

| ADDRESS CONVERSION TABLE | |
|---|---|
| FILE ADDRESS | LOGICAL VOLUME ADDRESS |
| FILE ADDRESS 1 | LBA01 |
| FILE ADDRESS 2 | LBA02 |
| FILE ADDRESS 3 | LBA03 |
| ... | ... |

34F

STORAGE SYSTEM AND STORAGE SYSTEM DATA MIGRATION METHOD

CROSS-REFERENCE TO RELATED APPLICATIONS

This application relates to and claims priority from Japanese Patent Application No. 2005-174653, filed on Jun. 15, 2005, the entire disclosure of which is incorporated herein by reference.

BACKGROUND OF THE INVENTION

1. Field of the Invention

The present invention relates to a storage system and storage system data migration method.

2. Description of the Related Art

A storage system, for example, is constituted by arranging a large number of disk drives in an array, and provides storage areas based on RAID (Redundant Array of Independent Disks). Logical volumes (Logical Units), which are logical storage areas, are formed on the physical storage area of each disk drive. A server, mainframe or other such host device can access a desired volume to read and write data by issuing a prescribed command to the storage system.

In accordance with operating a storage system, huge amounts of data come to be stored in the storage system. Accordingly, in order to effectively utilize the storage resources of a storage system, for example, so-called data migration technology has been proposed, whereby infrequently used data is stored on a low-speed disk drive.

One data migration technique generates respective disk pools for each type of disk drive, and presets various storage classes in the logical volumes inside the disk pools. Then, a file is moved to a logical volume having the optimum storage class based on the file's static and dynamic characteristics (Japanese Laid-open Patent No. 2004-295457).

Another data migration technique selects a volume, which satisfies preset reliability and performance conditions, and controls migration destinations in file units (Japanese Laid-open Patent No. 2004-70403).

In the prior art disclosed in the above-mentioned literature, data migration can be carried out in file units on the basis of file characteristics. However, even though files might have the same characteristics, their respective generation dates will differ, meaning the expiration dates of the respective files will vary.

For example, storage terms are established for respective types of data, such as e-mail data, invoice data, sales data, client data, and resident data, but the generation date of each file will differ, respectively. Therefore, even though files might be of the same type, their respective storage term expiration dates will differ. However, data migration, which takes such differences in file storage terms into consideration, is not addressed in the prior art. For this reason, in the prior art, even files of the same type, which were generated at times relatively close to one another, wind up being stored in different volumes, thereby reducing usability.

Further, there are cases in which the storage period required by type of file is longer than the life of the storage device. It is also quite possible that if a file is stored as-is in an obsolete storage device, this file will become difficult to read. Therefore, for example, thought is being given to migrating files from obsolete storage devices to tape devices for long-term storage. However, once a file has been migrated to a tape device, usability declines because it is no longer easy to access this file when file access is requested.

SUMMARY OF THE INVENTION

Accordingly, an object of the present invention is to provide a storage system and storage system data migration method, which make it possible to collectively manage files with varied storage time limits. Another object of the present invention is to provide a storage system and storage system data migration method, which make it possible to collectively manage files with varied storage time limits, and to carry out data migration taking into account the device life of a storage device. Other objects of the present invention will become clear from the embodiments explained hereinbelow.

To solve for the above-mentioned problems, a storage system according to a first aspect of the present invention comprises at least one or more host devices; a plurality of storage devices for providing volumes to this host device; and a management device, which is connected to the host device and storage devices, respectively. Then, the management device is constituted so as to acquire file information of a plurality of files, which is distributed and respectively stored in volumes of the respective storage devices, and based on this respective file information, extract a plurality of files, which match a pre-set data migration condition, generate at least one or more migration groups by sorting the storage time limit of extracted file by pre-set prescribed intervals, match the expiry of a migration group to the time limit of a file having the most distant future storage time limit of the files comprising the migration group, and migrate the migration group to a selected migration-destination volume.

The respective storage devices each comprise at least one or more volumes, and various files used by a host device are stored in at least a part of these respective volumes. The storage terms for these files, for example, are pre-set according to the type of file, such as "E-mail will be stored for a minimum of seven (7) years."

As file information, for example, file size, storage destination file address, and file update date/time (time stamp) can be cited. The management device, for example, extracts, as targets for data migration, those files for which a predetermined time period or longer has elapsed since file generation, and files for which a predetermined time period or longer has elapsed since the date of the last update.

When the management device extracts files targeted for data migration, it groups them by sorting the respective storage time limit into prescribed intervals. For example, the management device groups together files whose storage time limits expire within these prescribed intervals, such as units of one day, one week, one month, one quarter, one year and so forth, thereby establishing a migration group. Then, the management device sets as the storage time limit of this migration group the storage time limit of the file with the longest expiration time of the respective files in this migration group. Thus, the storage time limits of all the files belonging to this migration group expire at the same time. The management device selects a migration-destination volume for storing the migration group, and stores the respective files of the migration group in this migration-destination volume.

In an embodiment of the present invention, the management device can migrate a migration group between respective storage devices. That is, the management device can group files distributed among the respective storage devices into a migration group, and migrate the files of this migration group into the same or different storage devices.

In an embodiment of the present invention, information related to the device life of the respective storage devices is included in the data migration condition, and the management device migrates a migration group based on the device life of the respective storage devices.

In an embodiment of the present invention, the management device gives priority to the selection of a storage device with a device life that is longer than the expiry of a migration group, and migrates the migration group to this selected storage device. By selecting a storage device with as long as possible a device life as the migration-destination storage device, it is possible to restrict the number of times data migration occurs among storage devices, and to reduce the burden on the storage system.

In an embodiment of the present invention, the management device migrates a migration group within a prescribed grace period prior to a device reaching its life expectancy. For example, when device life is n years, a time period of around 80% thereof is used as the threshold value of device life. When the device life of a storage device reaches this threshold value, the migration group stored in this storage device is migrated to another storage device. Therefore, in the above-mentioned example, the grace period constitutes a period equivalent to 20% of the device life of n years (the difference between the device life and the threshold value of the device life).

In an embodiment of the present invention, for the initial migration of a migration group, the management device selects a migration-destination storage device on the basis of the precedences pre-set for the respective storage devices, and for the second and subsequent migrations of a migration group, it selects a migration-destination storage device by taking into account the device life of the respective storage devices. That is, a plurality of attribute information (precedence and device life) are established for selecting a storage device as a migration destination for data migration. An initial data migration is executed on the basis of precedence, which is the first attribute, and a second and subsequent data migrations are executed on the basis of device life, which is the second attribute. Then, in an embodiment of the present invention, a high precedence is established for a relatively high-performance storage device of the respective storage devices.

In an embodiment of the present invention, the management device maintains management information comprising the filenames of the files constituting the migration-destination volume of a migration group, and a migration group, and information for detecting a migration destination, and when the management device migrates a migration group, it deletes, from the migration-source volume, the respective files, which make up this migration group, and stores the information for detecting a migration destination in the migration-source volume. Then, in an embodiment of the present invention, when the management device receives a query specifying migration-destination detection information, it responds, based on the management information, with the migration destination of the queried file.

In an embodiment of the present invention, the management device distributes and stores management information in prescribed locations of all volumes related to a migration group. Thus, even if trouble occurs with the management information maintained by the management device, the management device can restore the management information by acquiring the information distributed in prescribed locations of the respective volumes.

In an embodiment of the present invention, at least any one or more storage devices of the respective storage devices is used as the connection-source storage device, and this connection-source storage device can utilize the volumes of the other respective storage devices by mapping the storage space of volumes of the other respective storage devices to the storage space of a virtual volume. The connection-source storage device maps the storage space of volumes of other storage devices to the storage space of a virtual volume, and establishes a logical volume on this virtual volume. Thus, the connection-source storage device is capable of utilizing the storage resources of other storage devices (connection-destination storage devices) just like they were its own storage resources.

A data migration method of a storage system according to another aspect of the present invention is a method for carrying out data migration by using at least one or more host devices; a plurality of storage devices for providing volumes to this host device; and a management device, which is connected to the host device and the respective storage devices, respectively, and comprises the steps of acquiring the respective file information of a plurality of files, which are respectively distributed and stored in the volumes of the respective storage devices; extracting, based on the respective file information, a plurality of files, which match a pre-set data migration condition; generating at least one or more migration groups by sorting the storage time limits of the extracted files by pre-set prescribed intervals; correlating the expiry of a migration group to the time limit of a file having the most distant future storage time limits of the files comprising the migration group; migrating the migration group from a migration-source volume to a migration-destination volume; and deleting the respective files constituting the migrated migration group from the migration-source volume, and storing migration-destination detection information for detecting the migration destination of the respective files in the migration-source volume.

A storage system according to yet another aspect of the present invention comprises at least one or more host devices; a plurality of storage devices for providing volumes to this host device; and a management device, which is connected to the host device and the respective storage devices, respectively.

Then, (1) the host device comprises (1A) an application program, which uses a volume; and (1B) a file access controller, which, based on a file access request from an application program, acquires a file from a prescribed volume, and acquires, from the volumes of the respective storage devices, file information related to files that a host device uses, respectively.

Further, (2) the management device comprises (2A) a migration management database for managing information related to data migration; (2B) a policy database for managing policy related to data migration; (2C) a file information acquisition portion, which receives respective file information collected by the file access controller; (2D) a migration manager for controlling the execution of data migration; and (2E) a storage controller for moving the files of respective volumes to respective storage devices.

In addition, (3) the storage device, which constitutes the connection source of the storage devices, comprises (3A) volumes, which are provided to a host device; (3B) a virtual volume, which is connected to a volume; and (3C) a mapping table for mapping the storage space of a volume of the storage device set as the connection destination of the storage devices, to the storage space of a virtual volume.

Then, (4) the management device executes the steps of (4A) extracting, on the basis of respective file information, and the storage contents of the policy database respectively acquired via the file information acquisition portion, files targeted for data migration from among a plurality of files distributed and stored in respective volumes; (4B) generating, based on the storage time limits of extracted files, and the prescribed time periods registered in the policy database, a migration group by grouping files in which storage time limits are included in the prescribed time period; (4C) correlating the expiry of a migration group to the time limit of the file having the most distant future storage time limit of the respective files comprising the migration group; (4D) causing the migration manager to determine the migration-destination volume of the migration group on the basis of the policy database and the migration management database; (4E) causing the migration manager to read out the respective files belonging to a migration group from the migration-source volumes and store them in the migration-destination volumes; (4F) deleting the migrated files from the respective migration-source volumes, and storing migration-destination detection information for detecting the migration destinations of the respective files on the migration-source volumes in the locations from which the respective files were deleted; and (4G) when a query specifying migration-destination detection information is received from the file access controller, responding to the file access controller with the location of the file related to the query, based on the migration-destination detection information and the storage contents of the migration management database.

There are cases in which at least a part of either means, functions or steps of the present invention can be constituted as a computer program. In this case, the computer program can be secured on a storage medium, such as a hard disk, semiconductor memory or optical disk, and distributed, or it can also be distributed via a communications network.

BRIEF DESCRIPTION OF THE DRAWINGS

FIGS. 7A and 7B are schematic diagrams showing a pool management table and storage term table, respectively;
FIG. 8 is a schematic diagram showing a group management table and a group configuration table, respectively;
FIG. 9 is a schematic diagram showing a migration log table;
FIG. 10 is a schematic diagram showing an address conversion table.

DESCRIPTION OF THE PREFERRED EMBODIMENTS

Figure 1:
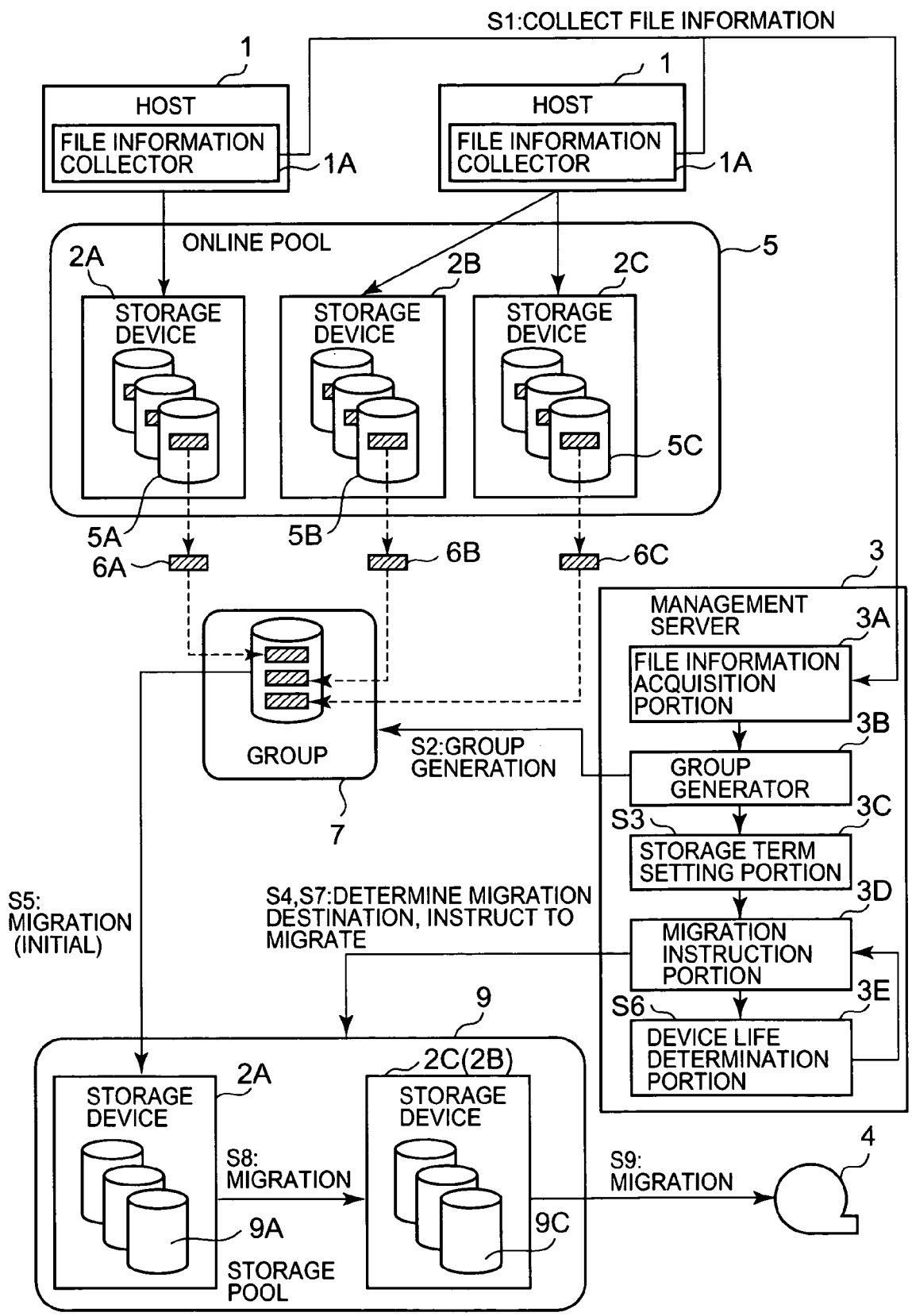
FIG. 1 is a schematic diagram showing the overall constitution of an embodiment of the present invention.

Aspects of the present invention will be explained below based on the figures. A storage system of this embodiment can be constituted comprising at least one or more host devices 1; a plurality of storage devices 2A, 2B, 2C for providing volumes 5A, 5B, 5C to this host device 1; a management server 3, which is connected to the host device 1 and the respective storage devices 2A through 2C; and a tape device 4.

The host devices (hereinafter, abbreviated as "hosts") 1, for example, are constituted as mainframe computers or server computers, and comprise respective file information collectors 1A. This file information collector 1A corresponds to a "file access controller", and, based on a file access request delivered from a host 1 OS (Operating System), accesses a prescribed volume 5A through 5C, and acquires a desired file. Further, the file information collector 1A is constituted so as to acquire, in accordance with a request from a management server 3, the file information of respective files utilized by this host 1, and to send the file information of these files to the management server 3.

Volumes 5A through 5C of the respective volumes of the storage devices 2A through 2C are online volumes currently being utilized by a host 1. Volumes 9A, 9C (or 9B) of the respective volumes are used as volumes for storage.

In this embodiment, a storage device 2A can be used as a connection-source storage device, and the other storage devices 2B, 2C can be used as respective connection-destination storage devices, and the highest precedence is set for the storage device 2A. The example shown in the figure shows that each of the storage devices 2A through 2C, respectively, provides online volumes, but it is also possible for the storage volume 2A alone to provide online volumes. Also, storage volumes can be provided by each of the storage devices 2A through 2C, respectively.

Online volumes 5A through 5C are registered in an online pool 5, and storage volumes 9A, 9C (9B) are registered in a storage pool 9.

A management server 3, which corresponds to a "management device", for example, can be constituted comprising a file information acquisition portion 3A, a group generator 3B, a storage term setting portion 3C, a migration instruction portion 3D, and a device life determination portion 3E.

The file information acquisition portion 3A requests the respective file information collectors 1A to collect file information, and delivers the respective file information sent from the respective file information collectors 1A to the group generator 3B.

The group generator 3B, based on respective file information, groups together files whose storage time limits arrive within a prescribed time period, and generates a migration group (hereinafter, abbreviated at times as "group"). For example, when there is a plurality of files, whose storage terms expire on a certain prescribed day, these files are managed as the same migration group. Therefore, the files belonging to a migration group are not necessarily the same type. Files with storage time limits that arrive within a prescribed time period will belong to the same group even if the files have completely different properties.

The storage term setting portion 3C correlates the storage term of a group to the storage term of the file having the latest storage time limit of the respective files in that group. That is, for example, when this groups comprises files having respectively different storage time limits, such as Jan. 1, 2010, Jan. 2, 2010, and Jan. 3, 2010, the storage term for this group is set at the latest date of Jan. 3, 2010. Therefore, the storage terms of the other files, whose storage terms were originally expected to expire earlier, are extended slightly.

The migration instruction portion 3D selects a group migration-destination volume from among the storage volumes 9A, 9C (9B) registered in the storage pool 9, and instructs the storage device to implement data migration.

The device life determination portion 3E determines whether or not to carry out data migration based on the device life of the respective storage devices 2A through 2C. For example, when a time period of around 80% of device life has elapsed, the device life determination portion 3E can decide to carry out data migration for a group, which is stored in the storage device with the shortest life.

The operation of this embodiment will be explained. The file information acquisition portion 3A requests that respective file information collectors 1A send file information. Upon receiving this request, the file information collectors 1A acquire the file information of the files under their respective management, and send the file information of these respective files to the file information acquisition portion 3A (S1).

Of the files scattered among the respective online volumes 5A through 5C, the group generator 3B groups together those files 6A through 6C, whose storage time limits arrive within a prescribe time period, as a migration group 7 (S2).

The storage term setting portion 3C correlates the storage term of this group 7 to the latest storage time limit of the respective files in this group 7 (S3). The migration instruction portion 3D furnishes the required instructions to the migration-source storage device 2A and the migration-destination storage device 2C (or 2B), and executes the data migration of the respective files 6A through 6C in the group 7 (S4).

A variety of methods can be applied here as the method for executing data migration. One is a method, whereby the management server 3 reads the respective migration-targeted files from the migration-source volumes, and writes the read files to a migration-destination volume. Another is a method, whereby data is copied between the migration-source storage device and the migration-destination storage device. When data migration is carried out in file units, the former method is effective since the respective files must be recognized. However, for example, when the respective migration-source storage device and migration-destination storage device comprise file systems, the latter method can also be used.

An initial data migration is carried out on the basis of the precedence pre-set for each of the storage devices 2A through 2C (S5). In this embodiment, the highest precedence is set for the storage device 2A. Therefore, the initial migration destination for group 7 becomes a volume under the management of storage device 2A. When the storage device 2A can utilize the respective volumes of the other storage devices 2B, 2C, there will be times when the storage destination resulting from the initial migration will be a volume residing in another storage device 2B, 2C, rather than a real volume inside the storage device 2A. However, since management is carried out by the storage device 2A even when the volume is in another storage device 2B, 2C, the volume can be treated as a volume of the storage device 2A.

When a period of time finally elapses, the device life determination portion 3E makes a determination as to whether or not further data migration is required based on the device life of the respective storage devices 2A through 2C, and the storage term of the migration group 7 (S6). For example, when the remaining life of the storage device in which the group 7 is stored is short, and the storage term of the group 7 is longer than this device life, if the situation is left as-is, it could become difficult to access the respective files 6A through 6C belonging to this group 7. Accordingly, when the storage term of a group 7 is longer than the life (remaining life) of a storage device, which is currently the storage destination, and this device life is short, the device life determination portion 3E will decide to execute a second data migration.

In the second data migration, storage device life is taken into account instead of the precedence of the storage device (S7). For example, a storage device, the remaining life of which is longer than the storage term of a group 7, is selected as the migration-destination storage device, and a volume of this storage device is selected as the migration-destination volume. Thus, the respective files 6A through 6C comprising the group 7 are migrated from the migration-source volume 9A to the migration-destination volume 9C (9B) (S8).

When time elapses further, the device life determination portion 3E once again determines the need for data migration taking into account the life of the storage device. If there is no storage device with suitable remaining life in the storage system, the files 6A through 6C belonging to the group 7 are migrated to a tape device 4.

In accordance with this thus-constituted embodiment, for example, it is possible to collect files 6A through 6C of a plurality of types, the storage time limits for which arrive within a prescribed time period, such as one day or one month, as a single group 7, and to carry out data migration collectively. Therefore, it is possible to collectively manage the data migration of a plurality of types of files with a more moderate range of storage terms, thereby enhancing usability.

In this embodiment, the initial data migration of the group 7 is carried out based on the precedence of the storage device, and the next data migration related to the same group 7 is carried out based on the life of the storage device. Therefore, in the initial data migration, the group 7 is migrated to a relatively high-performance storage device 2A, and can be provided for reuse by a host 1, and in the second and subsequent data migrations, a storage device, which corresponds to the storage term of the group 7, can be utilized. This enables the storage resources of a storage system to be used effectively, and also enhances usability. This embodiment will be explained in greater detail below by referring to the other figures.

1. First Embodiment

Figure 2:
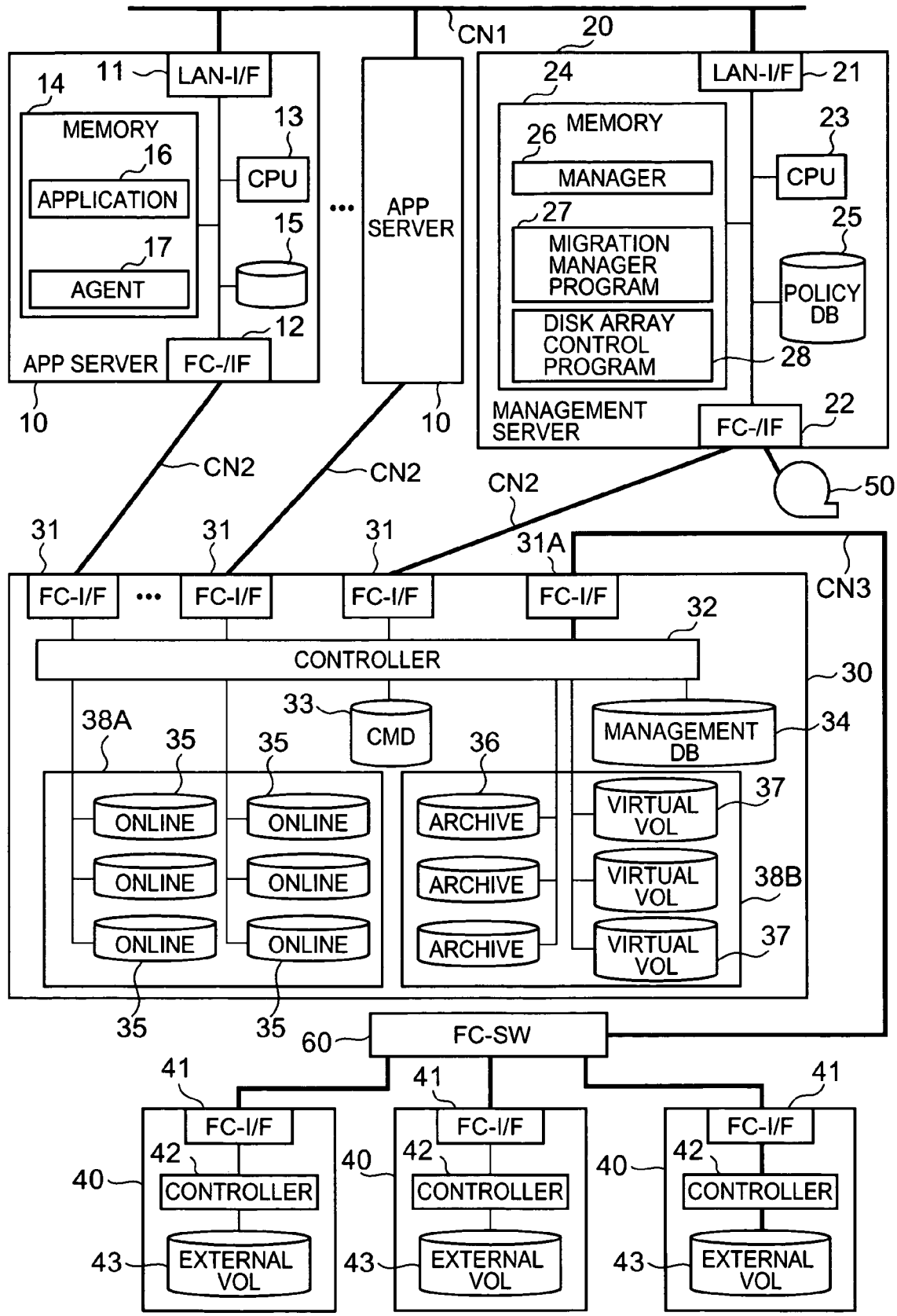
FIG. 2 is a block diagram of a storage system.

FIG. 2 is a block diagram showing the overall constitution of a storage system. This storage system can be constituted comprising, for example, a plurality of application servers (App servers in the figure) 10; a management server 20; a connection-source storage device 30; a plurality of connection-destination storage devices 40; a tape device 50; and a switch 60.

The network configuration will be explained first. The respective application servers 10 and management server 20, for example, are interconnected via a management network CN1 such as a LAN (Local Area Network) or WAN (Wide Area Network). The application servers 10 and management server 20, respectively, are connected to a connection-source storage device 30 by way of a host data communications network (hereinafter, "host network") CN2, such as a FC_SAN (Fibre Channel_Storage Area Network) or IP_SAN (Internet Protocol_SAN). The connection-source storage device 30 and the respective connection-destination storage devices 40, respectively, are connected, for example, via a subordinate data communications network (hereinafter, "subordinate network") CN3 and the switch 60, such as a FC_SAN.

The host network CN2 and subordinate network CN3 are isolated, and the communication state of the one does not have a direct effect on the other. Furthermore, another switch can be provided in the host network CN2. Further, in the following explanation, a situation, in which both the host network CN2 and the subordinate network CN3 are configured as FC_SAN, will be discussed, but these respective networks CN2, CN3 can also be configured as IP_SAN.

Next, the hardware configuration will be explained. The application servers 10, for example, can be constituted comprising a LAN communication portion ("LAN-I/F" in the figure) 11; a fibre channel communication portion ("FC-I/F" in the figure) 12; a CPU (Central Processing Unit) 13; a memory 14; and a local disk 15. Then, for example, an application program (abbreviated as "application" in the figure) 16, an agent program (abbreviated as "agent" in the figure) 17, and an OS can be stored in the memory 14.

The constitution of the management server 20 will be explained. The management server 20, for example, can comprise a LAN communication portion 21; a fibre channel communication portion 22; a CPU 23; a memory 24; and a policy database (database will be abbreviated as "DB" in the figures) 25. Then, for example, a manager program (abbreviated as "manager" in the figure) 26, a migration manager program 27, and a disk array control program 28, respectively, can be stored in the memory 24. Furthermore, in the figure, the term "program" has been omitted. The storage content of the policy database 25, and the operation of the respective programs will be explained below.

The constitution of the connection-source storage device 30 will be explained. The connection-source storage device 30 can be constituted comprising a plurality of fiber channel communication portions 31; a controller 32; a command device (hereinafter, abbreviated as "CMD") 33; a management database 34; a plurality of online volumes 35; a plurality of archive volumes 36; and a plurality of virtual volumes 37. The management database 34 will be explained in detail below.

The respective online volumes 35 are registered in an online pool 38A, and the archive volumes 36 and virtual volumes 37, respectively, are registered in a storage pool 38B. The virtual volumes 37 exist virtually to incorporate the external volumes 43 of the connection-destination storage devices 40. The focal point here is the connection-source storage device 30, and volumes that exist inside the connection-source storage device 30 will be called internal volumes, and volumes that exist outside of the connection-source storage device 30 will be called external volumes.

The storage space of one or a plurality of external volumes 43 is mapped to the storage space of one or a plurality of virtual volumes 37. Then, a logical volume is established on this virtual volume 37, and provided as a storage volume. Therefore, the actual data storage destination is an external volume 43, but access (the window) to this data is a logical volume on a virtual volume 37. This enables the connection-source storage device 30 to utilize an external volume 43 just as if it were its own storage device. Further, since a logical volume of the connection-source storage device 30 is logically connected to the external volumes 43 of the connection-destination storage devices 40 via the storage space of intermediate virtual volumes 37, a variety of services capable of being executed by the connection-source storage device 30 can be applied to external volumes 43 as well.

The respective connection-destination storage devices 40, for example, can be constituted comprising one or a plurality of fiber channel communication portions 41; a controller 42; and one or more external volumes 43. The connection-destination storage devices 40 are connected to the external connection communication portion 31A of the connection-source storage device 30 by way of a fiber channel communication portion 41, switch 60 and subordinate network CN3.

Figure 3:
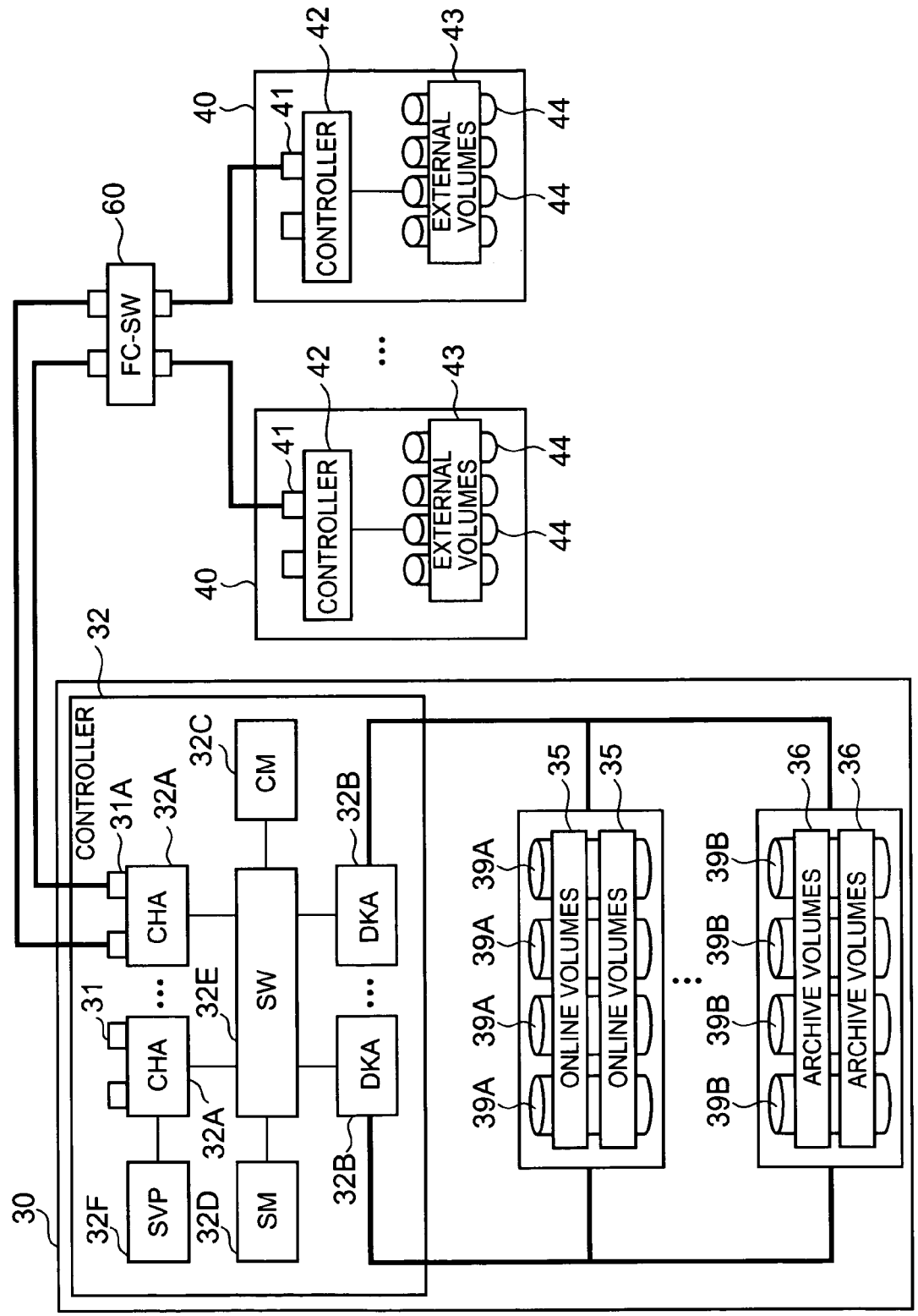
FIG. 3 is a block diagram showing the details of a storage device.

FIG. 3 is a block diagram showing a more detailed constitution of the connection-source storage device 30. The controller 32, for example, can be constituted comprising a plurality of channel adapters (hereinafter, "CHA") 32A; a plurality of disk adapters (hereinafter, "DKA") 32B; a cache memory ("CM" in the figure) 32C; a shared memory ("SM" in the figure) 32D; a connector ("SW" in the figure) 32E; and a service processor (hereinafter, "SVP") 32F.

A CHA 32A is for controlling the transfer of data to a server 10. The respective CHA 32A comprise one or more fibre channel communication portions 31, each of which is capable of carrying out data communications with a different server 10. A CHA 32A exchanges control information and the like with other CHA 32A and DKA 32B via the SM 32D.

Operation, to include that of the DKA 32B, will be explained first. When a read command is received from a server 10, the CHA 32A stores this read command in the SM 32D. The DKA 32B references the SM 32D all the time, and when it detects an unprocessed read command, it reads data from the specified volume 35, and stores it in the CM 32C. The CHA 32A reads the data, which has been transferred to the CM 32C, and sends it to the server 10.

When a write command is received from a server 10, the CHA 32A stores this write command in the SM 32D. The CHA 32A also stores the received write command in the CM 32C. After storing data in the CM 32C, the CHA 32A reports write-complete to the server 10. The DKA 32B reads the data stored in the CM 32C in accordance with the write command stored in the SM 32D, and stores it in a prescribed volume 35.

The DKA 32B is for controlling the respective data communications between the disk drives 39A. The respective DKA 32B and disk drives 39A, for example, are connected via a SAN or other such communications network, and carry out data transfer in block units in accordance with the fibre channel protocol. The respective DKA 32B monitor the status of the disk drives 39A at all times, and send the results of this monitoring to the SVP 32F.

The respective CHA 32A and DKA 32B, for example, comprise printed circuit boards mounted with processors and memories, and control programs stored in the memories (none of which is shown in the figure), and are constituted so as to realize respective prescribed functions by virtue of the teamwork of these hardware and software components.

The CM 32C, for example, is for storing data written from the server 10, or data read by the server 10. The CM 32C, for example, is constituted from non-volatile memory. The SM 32D, for example, is constituted from non-volatile memory. For example, control information, management information, and the like are stored in the SM 32D. These control and other types of information can be multiplexed and managed by a plurality of SM 32D. It is possible to provide a plurality of SM 32D and CM 32C, respectively. It is also possible to mount CM 32C and SM 32D together on the same memory board. Or, a part of a memory can be used as a cache area, and the other part can be used as a control area.

The SW 32E is for connecting the respective CHA 32A, DKA 32B, CM 32C and SM 32D, respectively. This makes it possible for all the CHA 32A and DKA 32B, respectively, to access the CM 32C and SM 32D. The SW 32E, for example, can be constituted as a crossbar switch or the like.

The connection-source storage device 30 can comprise a plurality of disk drives 39A, 39B. The disk drives 39A, 39B are examples of storage devices, and are not limited to hard disk drives, but rather, for example, can utilize semiconductor memory drives, optical drives (to include holographic drives), and so forth. In this embodiment, the disk drives 39A, 39B will be explained using hard disk drives.

A plurality of types of disk drives 39A, 39B can be mixed together in the connection-source storage device 30. For example, FC disk drives, SCSI (Small Computer System Interface) disk drives, SATA disk drives, SAS (Serial Attached SCSI) disk drives, and so forth can be cited as types of disk drives that can be used. Furthermore, the types of disk drives are not limited to the above; there will also be situations in which storage devices that are equivalent to the disk drives given as examples, or storage devices that could be developed in the future could also be used. This embodiment will be explained using a high-speed, high-performance FC disk drive as the one disk drive 39A, and a SATA disk drive as the other disk drive 39B.

For example, a RAID group (also called a parity group) can be formed using a prescribed number of disk drives 39A, such as four drives per group, or three drives per group. At least one or more online volumes 35 can be disposed in the storage areas provided by the respective RAID groups. By corresponding this logical volume to an LU (Logical Unit), an open system server 10 will recognize and use this volume 35 as a physical storage device. Also, an access-targeted volume of an open system server 10 is an LU, but the access target of a mainframe host is the logical volume 35 itself.

Similarly, with regard to the other disk drive 39B as well, a RAID group is formed using a prescribed number of drives 39B for the other disk drive 39B, and archive volumes 36 are formed inside this RAID group.

Furthermore, the constitution shown in FIG. 3 is one example, but the present invention is not limited to this. For example, the CHA 32A and DKA 32B can also be integrated. Also, the storage resources used by the connection-source storage device 30 do not all have to exist inside the connection-source storage device 30. As explained hereinabove, this is because the connection-source storage device 30 can incorporate and utilize the storage resources 43 of other storage devices 40, which exist outside the connection-source storage device 30 as if they were its own storage resources.

The SVP 32F is connected to the respective CHA 32A. For the sake of convenience, the SVP 32F is only connected to one CHA 32A in the figure, but in actuality, the SVP 32F is connected to each of the CHA 32A, respectively. The SVP 32F can access the SM 32D and the like via the CHA 32A.

Furthermore, the respective connection-destination storage devices 40 each comprise a plurality of disk drives 44, and external volumes are generated on the physical storage areas provided by these respective disk drives 44.

Figure 4:
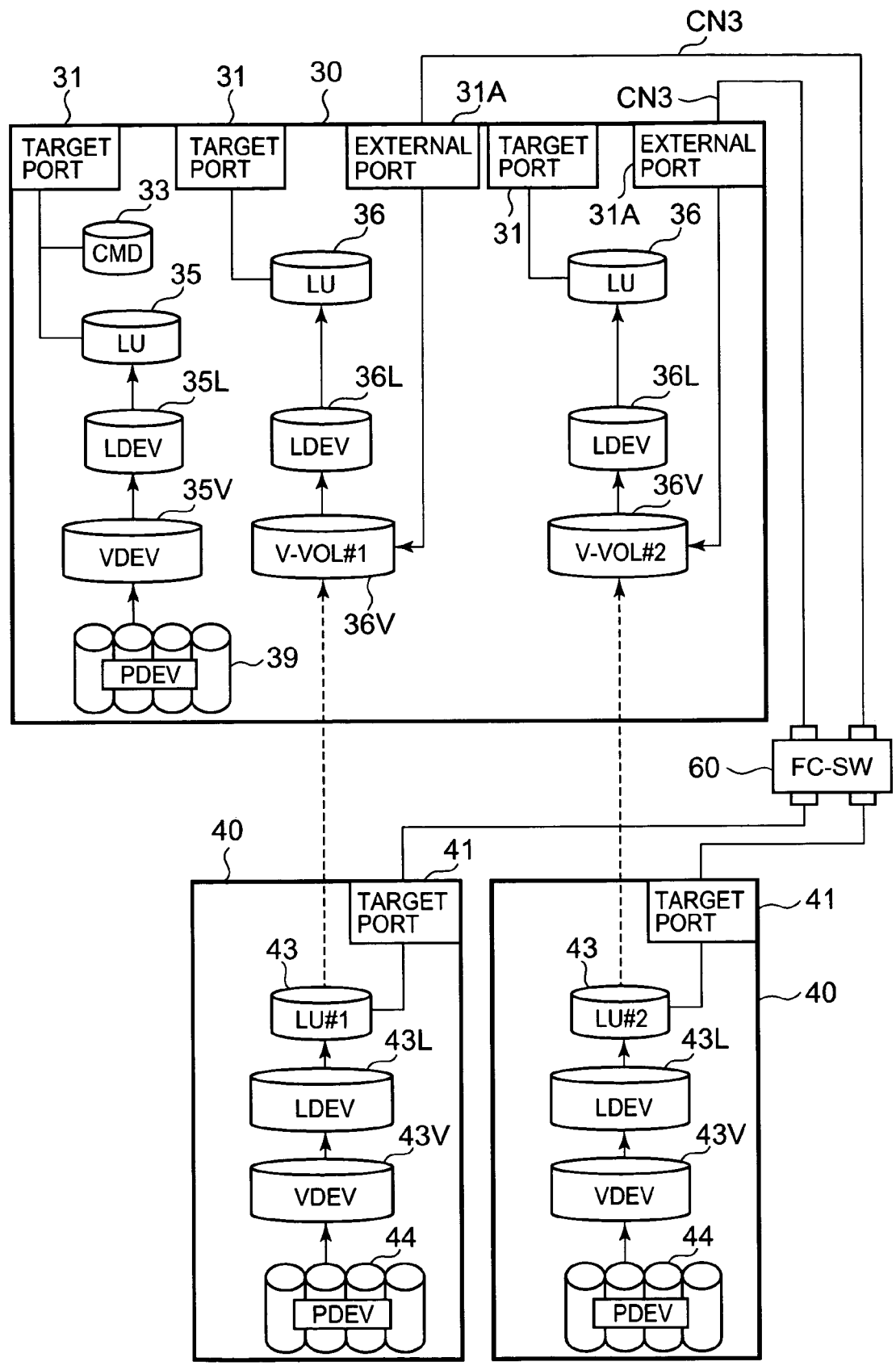
FIG. 4 is a schematic diagram showing the storage structure of a storage system.

FIG. 4 will be referenced. FIG. 4 is a schematic diagram showing the storage structure of a storage system. First of all, the constitution of the connection-source storage device 30 will be explained. The storage structure of the connection-source storage device 30, for example, can be broadly divided into a physical storage hierarchy and a logical storage hierarchy. The physical storage hierarchy is constituted from PDEV (Physical Device) 39, which are physical disks. PDEV correspond to disk drives 39. When the classification of disk drive does not matter, 39A and 39B will both be assigned the reference numeral 39.

The logical storage hierarchy can be constituted from a plurality (for example, two kinds) of hierarchies. The one logical hierarchy can be constituted from VDEV (Virtual Device) 35V, and a virtual VDEV (hereinafter, also referred to as "V-VOL") 36V, which can be treated like VDEV 35V. The other logical hierarchy can be constituted from LDEV (Logical Device) 36L.

The VDEV 35V, for example, are constituted by grouping together prescribed numbers of PDEV 39, such as four per group (3D+1P), eight per group (7D+1P) and so forth. The storage areas provided by the respective PDEV 39 belonging to a group can be integrated to form a single RAID storage area.

By contrast to the VDEV 35V, which are constructed on a physical storage area, the V-VOL 36V is a virtual intermediate storage device, which does not require a physical storage area. The V-VOL 36V are not directly associated with physical storage areas because they are used for mapping the LU of connection-destination storage devices 40.

At least one or more LDEV 36L can be disposed on either a VDEV 35V or V-VOL 36V, respectively. The LDEV 36L, for example, can be constituted by dividing a VDEV 35V into fixed lengths. By mapping an LDEV 36L to an LU 36, the server 10 recognizes the LDEV 36L as a single physical disk. The server 10 accesses a desired LDEV 36L by specifying a LUN (Logical Unit Number) and logical block address.

An LU 36 is a device recognizable as an SCSI logical unit. The respective LU 36 are connected to the server 10 by way of target ports 31. At least one or more LDEV 36L can be associated to the respective LU 36. Furthermore, the size of an LU can be virtually expanded by associating a plurality of LDEV 36L to a single LU 36.

A CMD (Command Device) 33 is a control LU, which is used for transferring commands and statuses between an agent program 17 running on the server 10, and a management server 20 and the controller 32 of the connection-source storage device 30. A command from the server 10 or the management server 20 is written to CMD 33. The controller 32 executes processing in accordance with the command written to the CMD 33, and writes the results of this execution to the CMD 33 as the status. The server 10 and management server 20 read and confirm the status written to the CMD 33, and write the contents of the next process to be executed to the CMD 33. Thus, the server 10 and management server 20 can provide various instructions to the connection-source storage device 30 via the CMD 33.

Furthermore, it is also possible for the controller 32 to directly process a command received from the server 10 and management server 20 without storing this command in the CMD 33. The present invention can also be constituted such that the CMD [33] is generated as a virtual device, and receives and processes commands from the server 10 and so forth without defining a real device (LU). That is, for example, the CHA 110 writes a command received from the server 10 to the SM 32D, and either the CHA 32A or the DKA 32B process the command stored in this SM 32D. These processing results are written to the SM 32D, and sent to the server 10 from the CHA 32A.

The connection-destination storage devices 40 are connected to an initiator port for connecting to the outside (External Port) 31A of the connection-source storage device 30 via the communications network CN3.

The connection-destination storage devices 40 comprise a plurality of PDEV 44; a VDEV 43V established on the storage area provided by the PDEV 44; and at least one or more LDEV 43L capable of being established on the VDEV 43V. Then, the respective LDEV 43L are associated to the LU 43. The PDEV 44 correspond to the disk drives 44 in FIG. 3.

The LU 43 (LDEV 43L) of a connection-destination storage device 40 is mapped to a V-VOL 36V, which is a virtual intermediate storage device. A RAID constitution can be applied to VDEV 35V and V-VOL 36V. That is, a single disk drive 39 can be allocated to a plurality of VDEV 35V and V-VOL 36V (Slicing), and a single VDEV 35V and V-VOL 36V can be formed from a plurality of disk drives 39 (Striping).

Figures 5, 6:
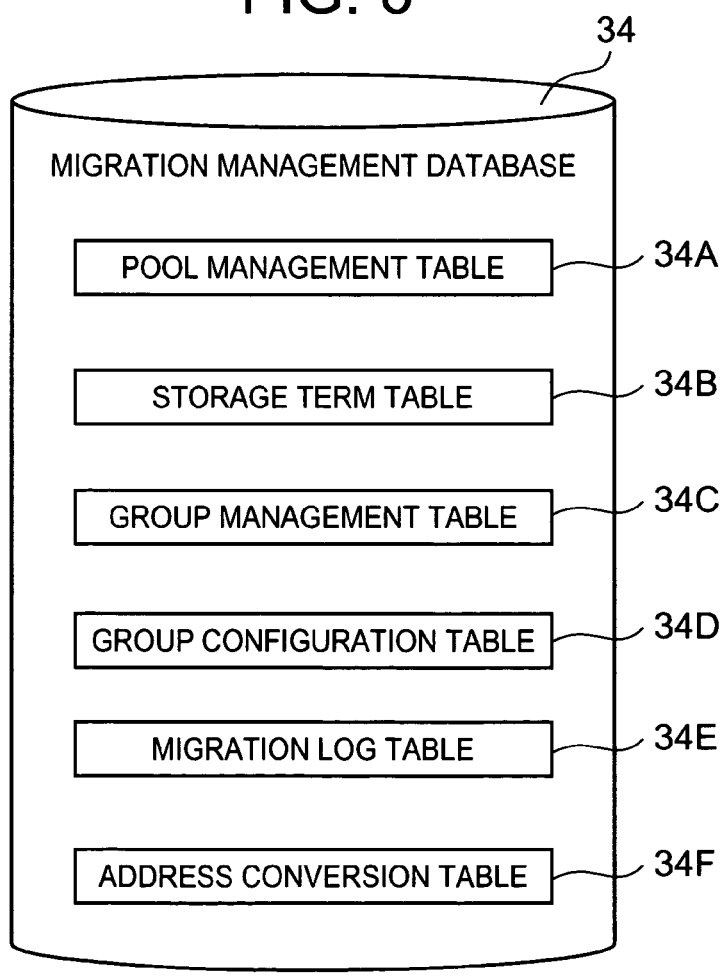
FIG. 5 is a schematic diagram showing a mapping table.
FIG. 6 is a schematic diagram showing a migration management database.

FIG. 5 is a schematic diagram showing an example of a mapping table T1, which is used for capturing the external volumes 43 of the connection-destination storage devices 40 to the connection-source storage device 30.

The mapping table T1, for example, can be constituted by correlating. LUN numbers, LDEV-related information, and VDEV-related information.

As LDEV-related information, for example, LDEV number and capacity ("MAX SLOT No." in the figure) can be cited. As VDEV-related information, for example, it is possible to cite the VDEV number, capacity, device type, and path information. Here, VDEV-related information comprises V-VOL 36V information as well.

For example, "Device Type" can comprise information about the classification of a device, whether it is a tape system device or a disk system device, and what kind of disk it is (FC disk or SATA disk, and so forth). "Path Information" comprises, for example, information for accessing this VDEV. When a VDEV corresponds to an external volume 43 (that is, when it is a V-VOL), path information, for example, comprises identification information (WWN) peculiar to the respective communication ports 31A, and LUN numbers for identifying the LU 43.

Using a mapping table T1 like this makes it possible to map either one or a plurality of external disk drives 44 to a V-VOL 36V inside the connection-source storage device 30. Furthermore, as with the other tables shown below, the volume number in the table is given as an example for explaining the table constitution, and does not necessarily correspond to the constitutions shown in the other figures.

FIG. 6 is a schematic diagram showing an example of a constitution of a migration management database 34. The migration management database 34 manages various information for managing data migration within the storage system. The migration management database 34, for example, can be constituted comprising a pool management table 34A, a storage term (which can be said as retention term) table 34B, a group management table 34C, a group configuration table 34D, a migration log table 34E, and an address conversion table 34F.

FIGS. 7A and 7B are schematic diagrams showing examples of constitutions of a pool management table 34A and a storage term table 34B, respectively.

The pool management table 34A is information for managing the volumes registered in a pool. This pool management table 34A, for example, can be constituted by correlating device identification information (hereinafter, identification information will be abbreviated as "ID"), precedence ranking, installation date, device life, threshold value, LU number (LU#), and LU size.

Device ID is information that enables the respective storage devices 30, 40 inside a storage system to be uniquely specified. The precedence ranking is information utilized for selecting the migration destination for data migration, and is uniquely established for each storage device 30, 40, respectively. The installation data is information showing the date on which a storage device 30, 40 was installed. In-service date can be used instead of installation date. Device life is information showing the life of the respective storage devices 30, 40. The threshold value is information showing a threshold value related to the device life. As the threshold value, a percentage value is used. When the cumulative running time from the date of installation reaches the threshold value, data migration is executed based on device life, which will be explained hereinbelow.

The storage term table 34B, for example, can be constituted by correlating device ID, LU number, LU size and storage term. The storage term is the storage time limit set for each volume. This storage term applies to all files stored in a volume. For example, when a file is stored in a seven-year storage volume, this file will be stored for at least seven years from the date it was generated.

FIG. 8 is a schematic diagram showing respective examples of a group management table 34C and a group configuration table 34D.

The group management table 34C is a table for managing a migration group. The group management table 34C, for example, is constituted by correlating group ID, storage time limit, and size. The group ID is information for uniquely specifying respective migration groups inside the storage system. The storage time limit is information indicating the final date and time until which the respective files comprising a migration group should be stored. A file for which the storage time limit has elapsed can be deleted from inside the storage system. The size is information showing the overall size of a migration group, and corresponds to the sum of the sizes of the respective files comprising each migration group.

The group configuration table 34D is information for managing the configurations of the respective migration groups. The group configuration table 34D, for example, is constituted by correlating group ID, filename, file address, file creation date, last access date, and migration ID.

Filename is information indicating the name of a file belonging to a migration group. File address is information indicating the storage destination of a file, and is utilized by the OS (file system) of the server 10 and management server 20. The file creation date is information indicating the date and time (year, month, date, hour, minute and second) that a file was generated. Last access date is information showing the date and time that a file was last used. The migration ID is information utilized when a file is moved, and is linkage information, which indirectly shows the migration destination of the file.

FIG. 9 is a schematic diagram showing an example of a migration log table 34E. The migration log table 34E, for example, can be constituted by correlating a migration ID assigned prior to data migration execution, a group ID, the migration execution date/time, migration end date/time, the movement source (migration source) LU number, the movement destination (migration destination) LU number, and the migration ID assigned after data migration execution.

The pre-execution migration ID is the migration ID set for the respective files prior to a new data migration. Migration execution date/time is information indicating the date and time that a new data migration commenced. Migration end date/time is information indicating the date and time that a new data migration was completed. The migration-source LU number is information for specifying the source volume in which the files were originally stored, and the migration-destination LU number is information for specifying the destination volume in which the files are to be stored. The post-execution migration ID is the migration ID newly set in accordance with a new data migration. Therefore, even when the agent program 17 queries the location of a file by specifying either the old or new migration ID, the management server 20 can respond to the request.

FIG. 10 is a schematic diagram showing an example of an address conversion table 34F. An address conversion table 34F is provided for each type of OS, but only one is shown in FIG. 10. The address conversion table 34F is for converting a file address used by an OS (file system) to a block address of a logical volume (LBA (Logical Block Address)). By using this conversion table 34F, the management server 20 can read file data from a volume, and write file data to a prescribed location in a volume.

Figure 11:
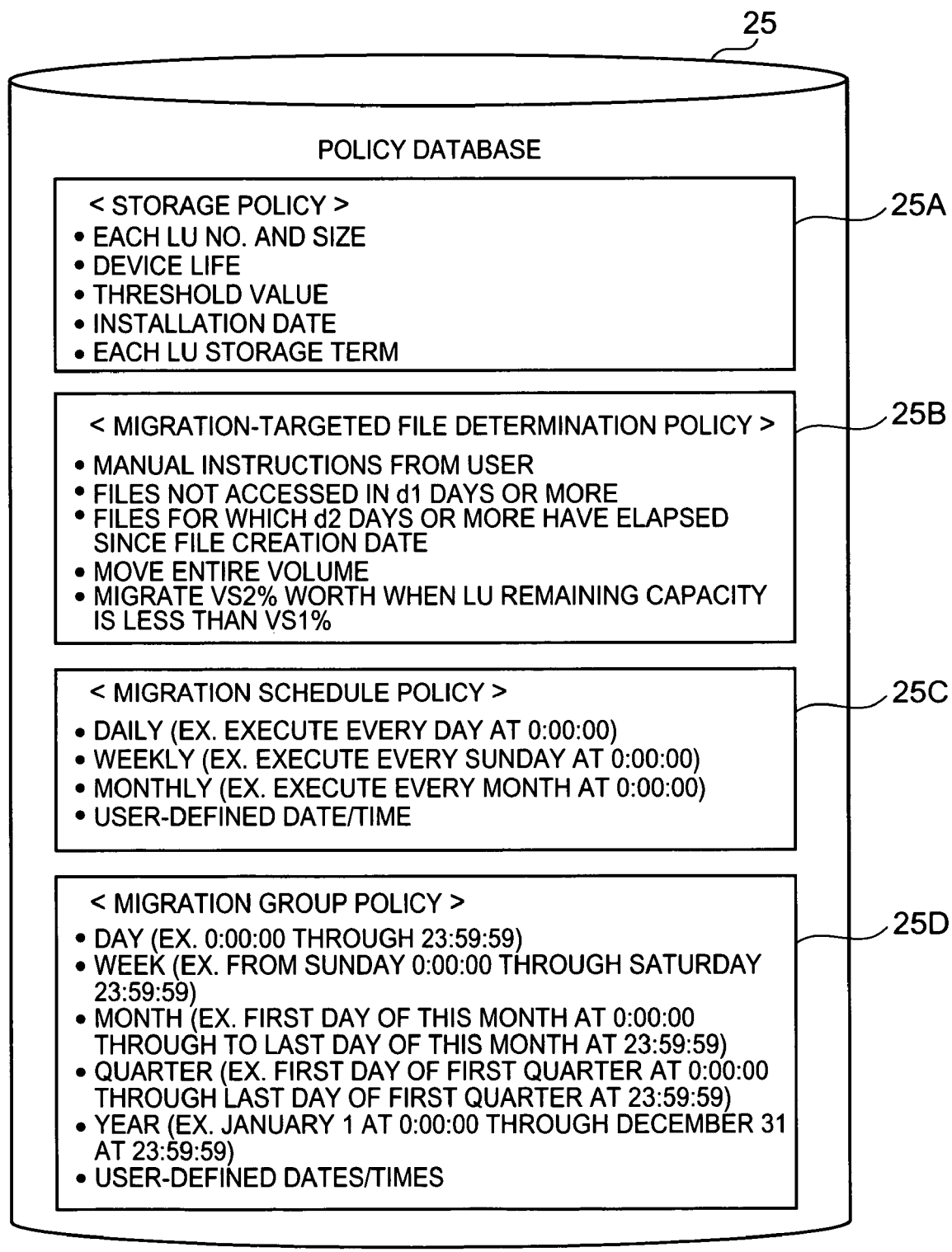
FIG. 11 is a schematic diagram showing a policy database.
Figure 12:
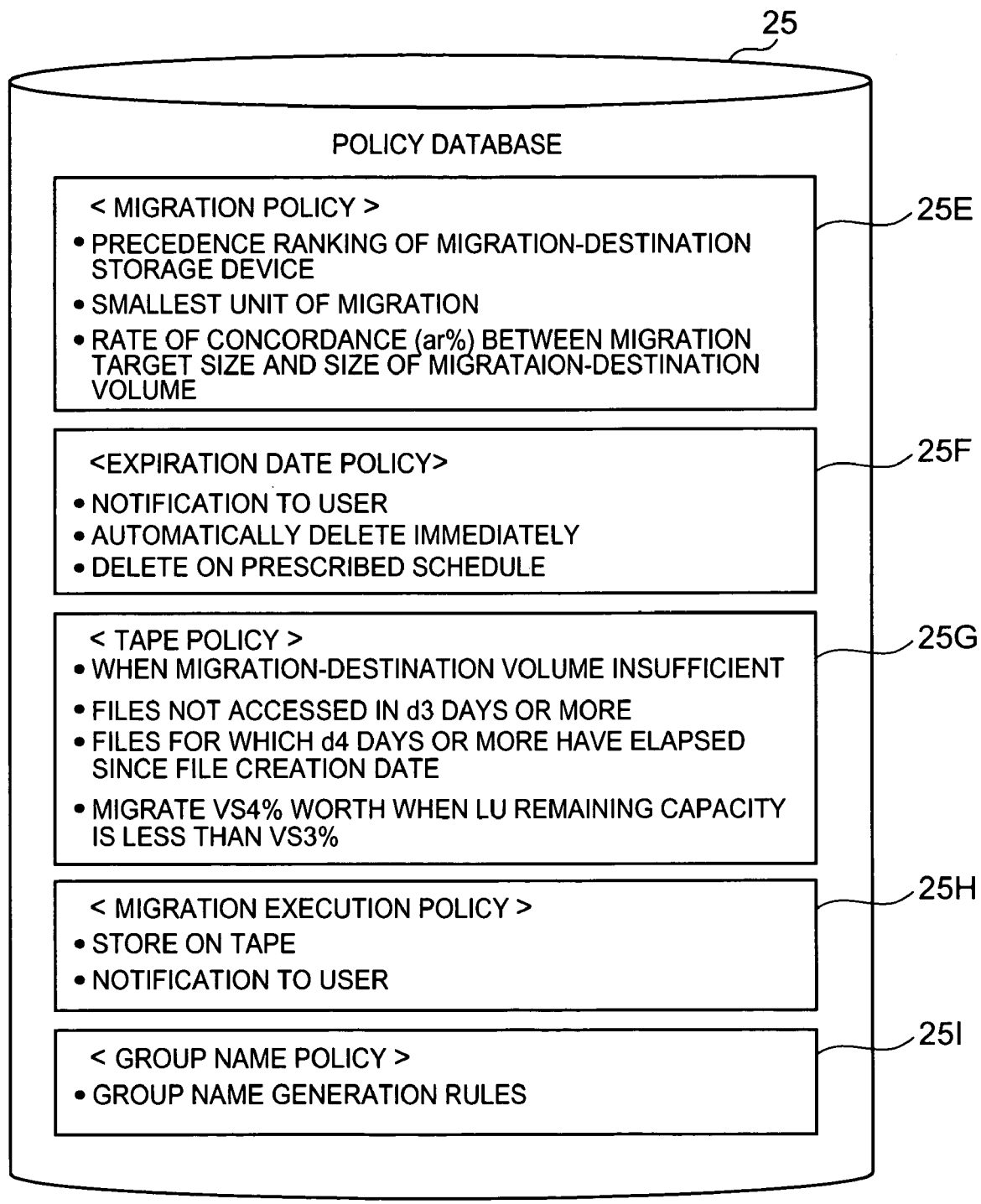
FIG. 12 is a continuation of FIG. 11.

FIGS. 11 and 12 are schematic diagrams showing an example of the storage content of a policy database 25. The policy database 25, for example, can be comprised of a storage policy 25A, migration-targeted file determination policy 25B, migration schedule policy 25C, migration group policy 25D, migration policy 25E, expiration date policy 25F, tape policy 25G, migration execution policy 25H, and group name policy 25I. These respective policies 25A through 25I can be set by a user, such as a systems administrator.

The storage policy 25A is for registering a policy related to a volume pool established as the storage system migration area. For example, the LU numbers and LU sizes of the respective storage devices 30, 40, the device life of each storage device 30, 40, the threshold value for the device life (hereinafter, also referred to as the life threshold value), the installation dates/times of the respective storage devices 30, 40, and the storage terms for the respective LU are registered in the storage policy 25A.

The migration-targeted file determination policy 25B is for registering the conditions for carrying out an initial data migration. Triggers for carrying out an initial data migration, such as, for example, "manually move files specified by a user", "move files which have not been accessed in d1 or more days", "move files for which d2 days or more have elapsed since file creation date", "move all files comprising a specified volume", and "when the remaining capacity of a volume (LU) is VS1%, move only VS2% worth of the files comprising this volume" and the like are registered in this policy 25B.

The data migration execution time is registered in the migration schedule policy 25C. Execution times, for example, can be set as daily, weekly, monthly and as a user-defined date/time.

Conditions for generating a migration group, which will constitute a data migration unit, are set in the migration group policy 25D. Files, whose storage time limit arrives within the time period registered here, can be grouped into a single migration group. For example, units of a day, week, month, quarter, year or a user-defined time period can be used as the time condition for generating a migration group.

The explanation will move to FIG. 12. The migration policy 25E is for registering conditions related to the migration-destination storage devices of a data migration. In this policy 25E, for example, it is possible to register a precedence ranking for each storage device, the smallest unit of a data migration, and the rate of concordance between the targeted size of a data migration (the size of the migration group) and the size of the migration-destination volume.

The precedence ranking, for example, can provide the highest precedence ranking to the storage device with the highest performance inside the storage system, and can set lower precedence rankings in line with reduced performance. The smallest unit of migration, for example, can be set, in accordance with a user's desires, to bit, byte, kilobyte (Kbyte), megabyte (Mbyte), or gigabyte (Gbyte) units.

The migration target size can be rounded up. For example, when the migration target size is 3.2 Gbytes, it can be rounded up to 4 Gbytes. This makes it possible to lower the risk of a data migration failing because the size of the selected migration-destination volume fell short of the migration target size. This is because, since the size of the migration-destination volume is selected on the basis of the rounded up size, it is possible to use a migration-destination volume of a size that is slightly larger than the migration target size.

The rate of concordance between the migration target size and the size of the migration-destination volume is a threshold value for showing how similar the two sizes must be before data migration will be allowed. For example, when 90% is set as the rate of concordance, if 90% or more of the size of a volume can be utilized, then that volume can be selected as the migration-destination volume.

The expiration date policy 25F is for registering the handling of files that belong to a migration group for which the expiration date has expired (the storage term has expired). As methods for handling these files, for example, there are "warn the user that there are files whose expiration dates have expired", "immediately automatically delete files whose expiration dates have expired", or "delete files whose expiration dates have expired on a scheduled basis".

The tape policy 25G is for registering methods for using a tape device 50 when such a tape device 50 exists inside the storage system. For example, conditions for migrating data to the tape device 50, such as "use the tape when the migration-destination volume is insufficient", "move files, which have not been accessed in d3 days or longer, to the tape", "move files for which d4 days or more have elapsed since the file creation date", and "when the remaining capacity of a volume is VS3% or less, move only VS4% worth of the files stored in this volume", are registered in the tape policy 25G.

The migration execution policy 25H is for registering methods for handling a situation in which a suitable migration-destination volume could not be found. As methods for handling this situation, for example, "migrate to tape device", and "warn user" can be cited.

Furthermore, the group name policy 25I is for registering the rules for setting the names of migration groups.

Figure 13:
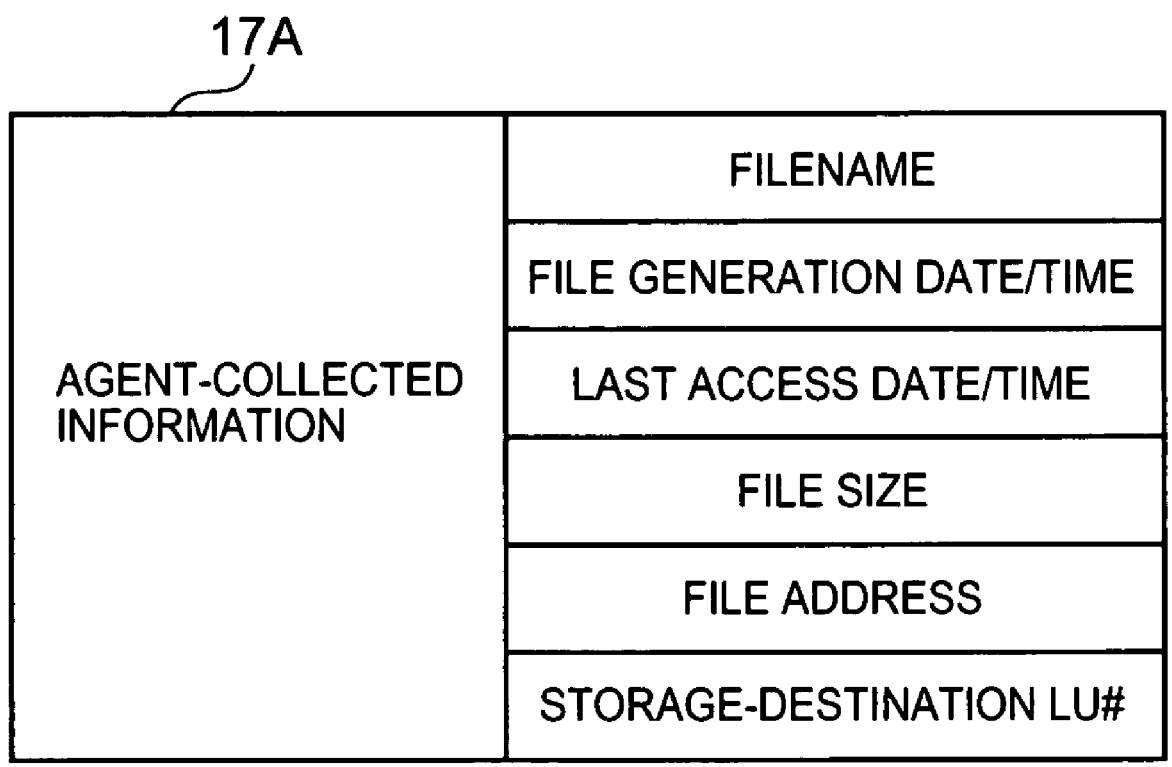
FIG. 13 is a schematic diagram showing file information collected by an agent program.

FIG. 13 is a schematic diagram showing an example of file information collected by respective agent programs 17. Agent programs 17, for example, collect the filenames, file generation dates/times, last access dates/times, file sizes, file addresses, and LU numbers of storage destinations for the respective files utilized by each of the servers 10. This file information is sent from the respective agent programs 17 to a manager program 26.

Figure 14:
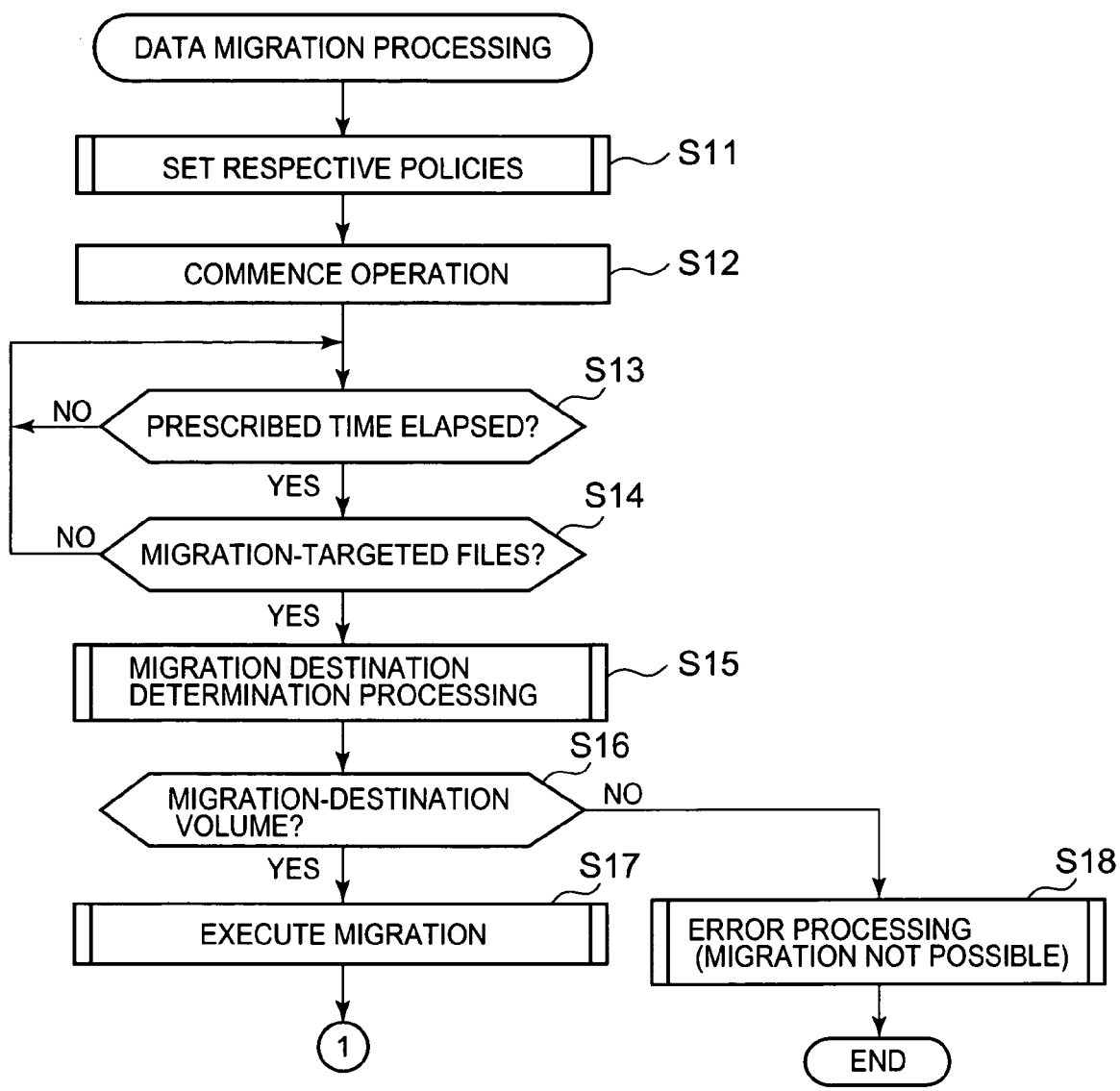
FIG. 14 is a flowchart showing an overall outline of data migration.
Figure 15:
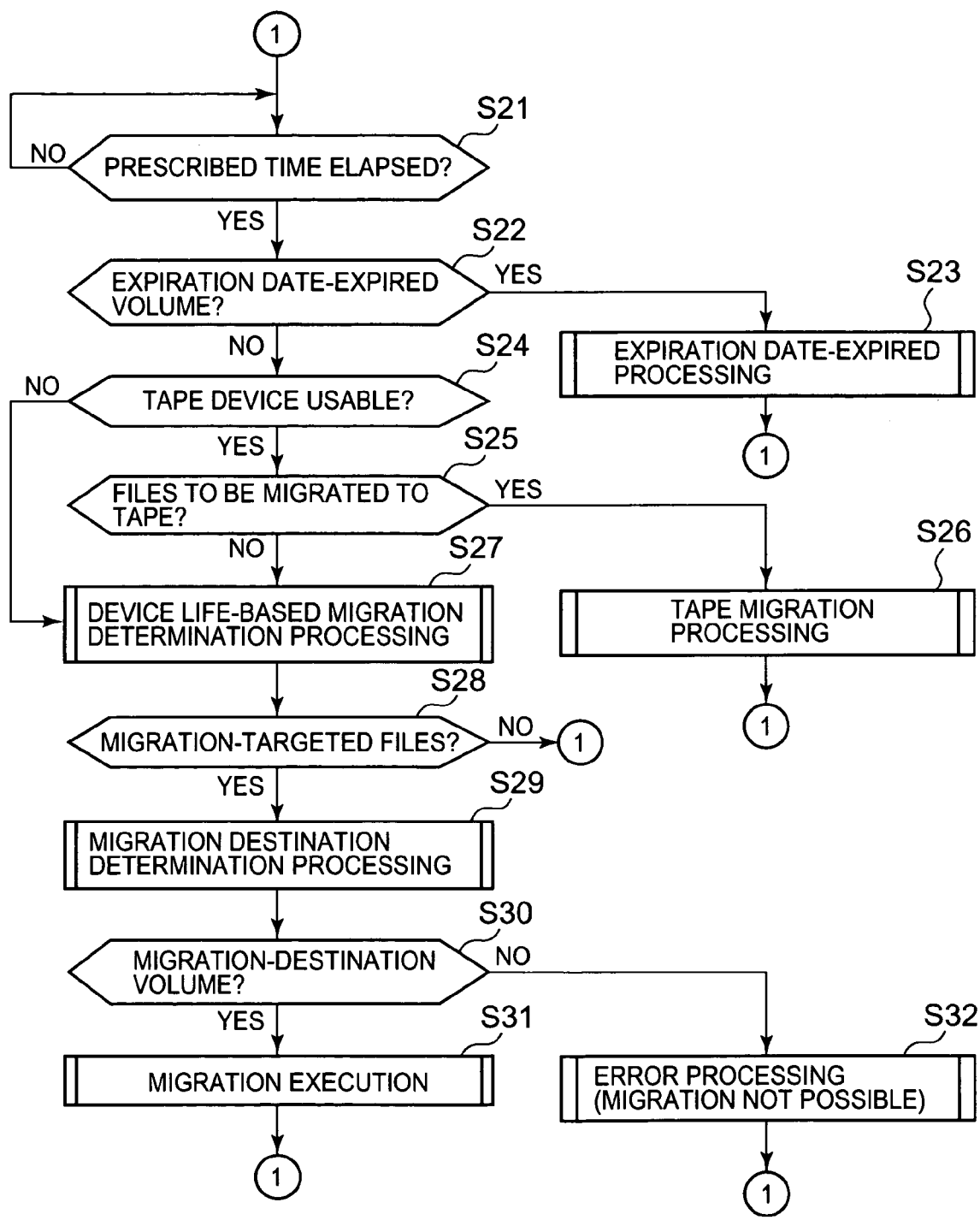
FIG. 15 is a continuation of FIG. 14.

FIGS. 14 and 15 are flowcharts showing an overview of a data migration. First, a user carries out pre-registration for the respective policies 25A through 25I discussed in the explanation of the policy database 25 (S11), before commencing operation of the storage system (S12).

When the prescribed time registered in the migration schedule policy 25C elapses (S13: YES), the management server 20 determines, on the basis of the migration-targeted file determination policy 25B, whether or not there are files targeted for migration (S14).

When migration-targeted files are found (S14: YES), the management server 20 executes processing for determining a migration destination (S15). The details of this processing will be explained below. Then, the management server 20 determines whether or not a volume capable of being used as the data migration destination has been detected (S16). When a suitable migration-destination volume is detected (S16: YES), the management server 20 executes a data migration using this detected migration-destination volume (S17). The details of this processing will be explained below. When a suitable migration-destination volume cannot be detected (S16: NO), prescribed error processing is carried out based on the migration execution policy 25H (S18).

The explanation will shift from the flowchart shown in FIG. 14 to the flowchart shown in FIG. 15 by way of the connector. After the initial data migration has been executed (S17), once a prescribed time has elapsed (S21), the management server 20 determines whether or not there are volumes whose expiration dates have expired (S22). An expiration date-expired volume is a volume for which the storage terms of all the files stored in this volume have elapsed, and further storage is unnecessary. When an expiration date-expired volume is detected (S22: YES), the management server 20 executes processing based on the expiration data policy 25F (S23).

The management server 20 determines whether or not it is possible to use a tape device 50 (S24). When the tape device 50 can be used (S24: YES), the management server 20 determines, on the basis of the tape policy 25G, if there are files to be migrated to a tape (S25). When there are files to be migrated to a tape (S25: YES), the management server 20 stores those files on the tape device 50 (S26).

When there are not any files to be migrated to a tape (S25: NO), the management server 20 executes processing for determining whether or not to carry out a migration on the basis of device life (S27). This processing will be explained in detail below. When the tape device 50 cannot be utilized (S24: NO), the management server 20 skips S25 and goes to S27.

When there are no files targeted for data migration on the basis of device life, processing returns to S21. When migration-targeted files exist (S28: YES), the management server determines a migration-destination volume by taking device life into account (S29). This processing will be explained in detail below.

When a migration-destination volume that is suitable from the standpoint of device life is detected (S30: YES), the management server 20 executes data migration using this detected migration-destination volume (S31), and returns to S21. When a suitable migration-destination volume cannot be detected (S30: NO), the management server 20 carries out prescribed error processing based on the migration execution policy 25H (S32), and returns to S21.

Figure 16:
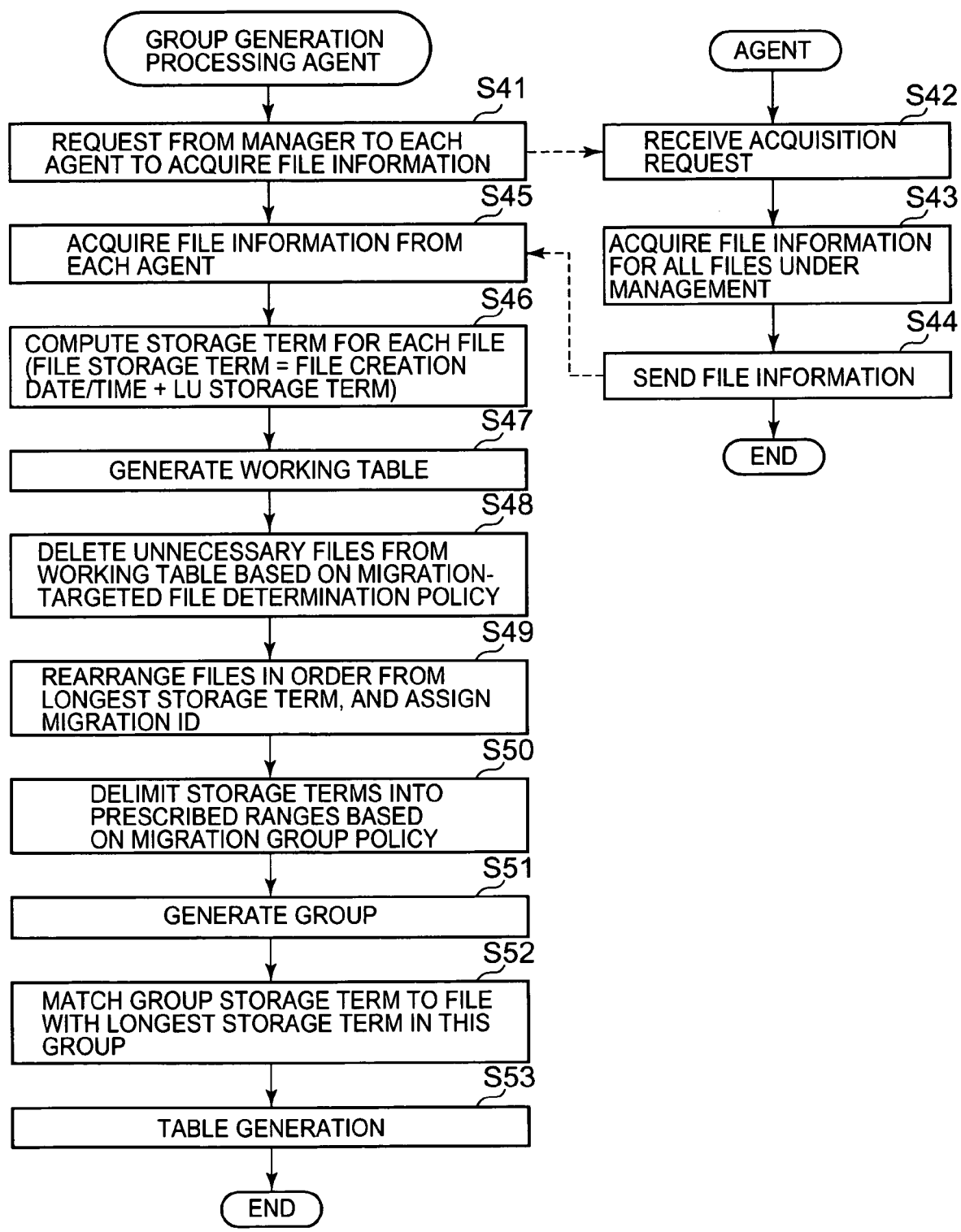
FIG. 16 is a flowchart showing group generation processing.
Figure 17:
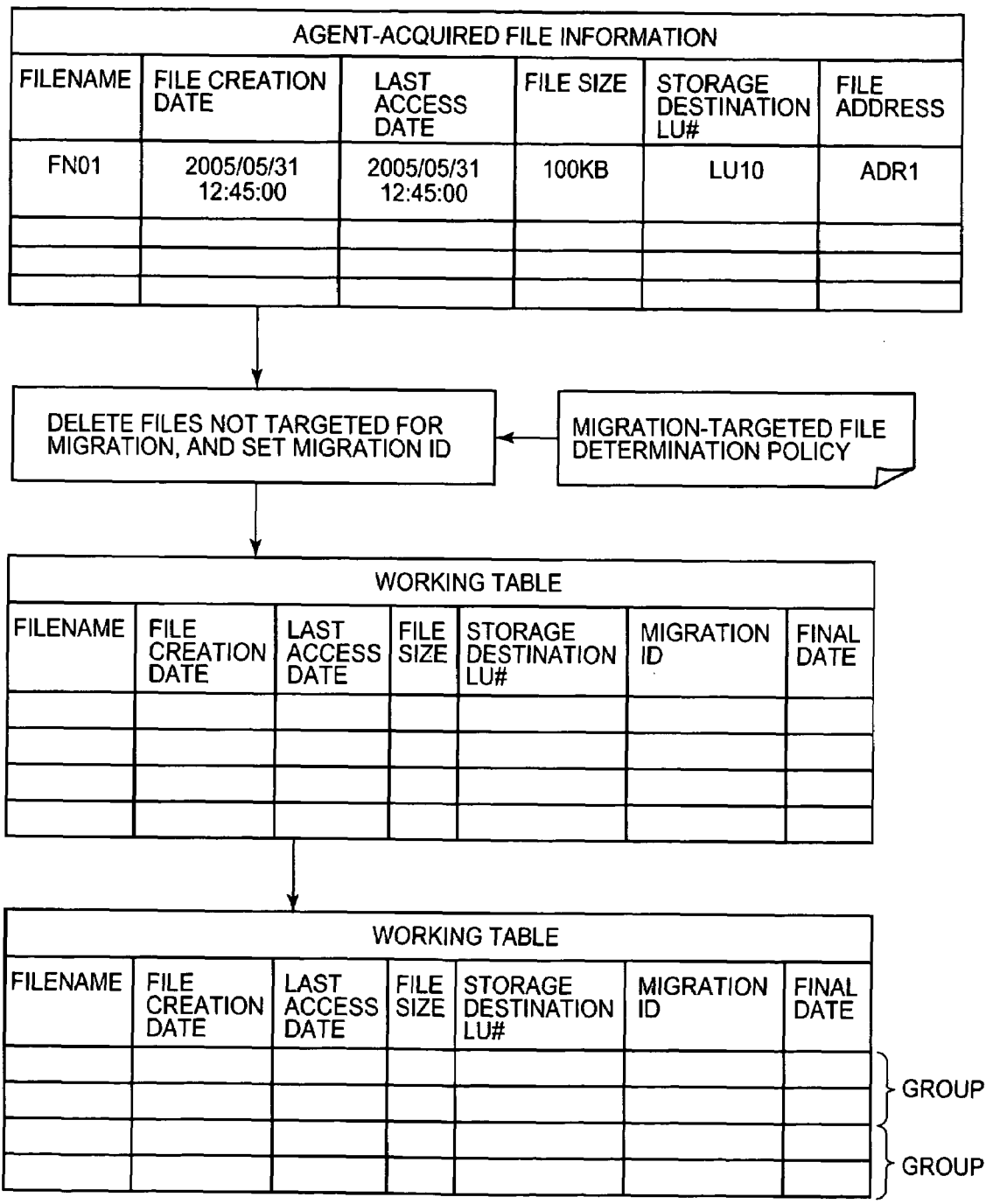
FIG. 17 is a schematic diagram schematically showing the generation of a group.

FIG. 16 is a flowchart showing the group generation processing performed when migration destination determination processing (S15) is executed. FIG. 17 is a schematic diagram showing a diagrammatic view of the essential portions of this flowchart.

The manager program 26 of the management server 20 requests the agent programs 17 of the respective servers 10 to respectively acquire file information (S41). Upon receiving this request (S42), the respective agent programs 17 acquire the respective file information of all the files under the management of the servers 10 (S43), and respectively send the respective acquired file information to the manager program 26 (S44).

When the manager program 26 acquires the file information from the respective agent programs 17 (S45), it transfers this file information to the migration management program 27.

The management server 20 computes the storage terms of the respective files based on this file information (S46). More specifically, the storage term of a file can be computed by adding the creation date/time of the file to the storage term set for volume in which the file is stored.

In this manner, the management server 20 computes the respective storage terms for all the files in the storage system, and registers them in a working table as shown in the approximate middle portion of FIG. 17 (S47).

The management server 20 inspects each file registered in the working table on the basis of the migration-targeted file determination policy 25B, and deletes from the working table that information related to unneeded files, which are not targeted for data migration (S48).

After deleting the information of files not targeted for data migration, the management server 20 rearranges the records of the working table in order from the longest storage term (in order from the shortest storage term is also acceptable), and, in addition, sets a migration ID for each file (S49).

The management server 20 sorts the files registered in the working table by prescribed time periods on the basis of the migration group policy 25D (S50), and generates either one or a plurality of migration groups (S51). A prescribed group name is set in a generated migration group based on the group name policy 25I.

The management server 20 matches the storage term of a generated migration group to the file with the longest storage term inside this group (S52). Then, the management server 20 generates a group management table 34C and group configuration table 34D, and ends this processing (S53).

Figure 18:
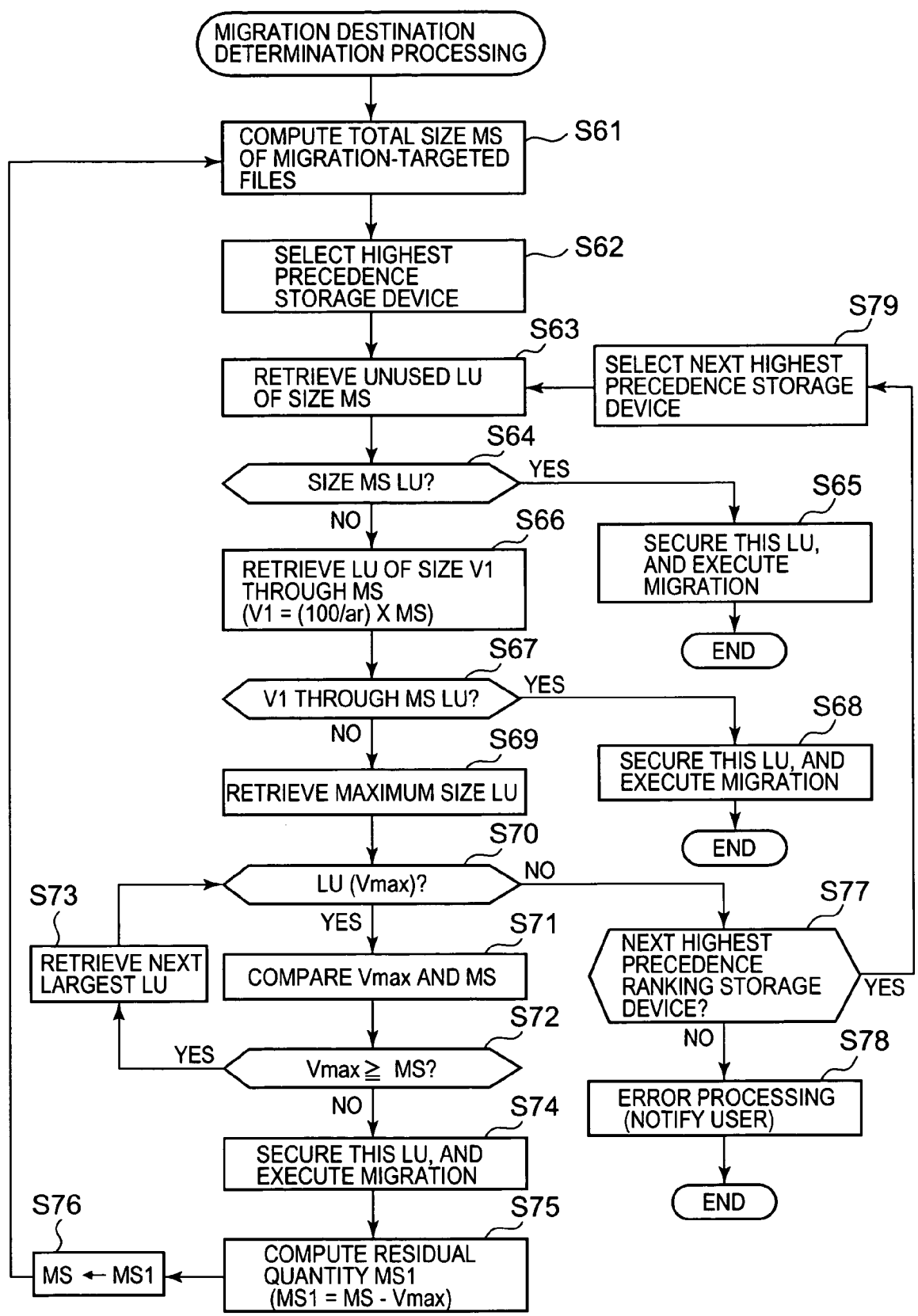
FIG. 18 is a flowchart showing the processing for determining a first migration destination.

FIG. 18 is a flowchart showing migration destination determination processing. This flowchart corresponds to S15 in FIG. 14. First, the management server 20 computes the total size (MS) of the migration-targeted files. The total size MS can be determined by finding the sizes of all the files comprising the migration group.

The management server 20 selects the storage device, which has the highest precedence (precedence ranking) of the respective storage devices 30, 40 in the storage system (S62). Here, it is supposed that the connection-source storage device 30 is selected.

The management server 20 searches among the volumes 36, 37 of the selected storage device 30 for a volume (LU) of the same size as the total size MS (S63). When a volume that matches the total size MS is detected (S64: YES), the management server 20 secures this volume, and executes data migration (S65).

When a volume that matches the total size MS is not detected (S64: NO), the management server 20 expands the size of the volume capable of being selected to a range of MS through V1, and once again searches for a volume of the storage device 30 (S66). Here, V1 is determined based on the rate of concordance ar of a volume and the migration target size MS (V1=(100/ar)×MS). That is, the management server 20 allows some wastage to occur in the migration-destination volume. This allowable rate of wastage corresponds to the rate of concordance ar.

When a volume having a size of V1 through MS is detected (S67: YES), the management server 20 secures this volume, and executes data migration (S68). When a volume having a size of V1 through MS is not detected (S67: NO), the management server 20 searches for the maximum size volume among the volumes 36, 37 of the storage device 30 (S69).

When the management server 20 detects the maximum size volume (S70: YES), it compares this detected maximum size Vmax against the migration target size MS (S71), and determines if the Vmax is larger than the MS (S72).

When the Vmax is larger than MS (S72: YES), the management server 20 retrieves the volume having the next largest size (S73), and once again compares the Vmax to the MS (S71). A Vmax larger than the MS signifies that the size of this volume is larger that the size V1 permitted by the rate of concordance ar, and when this volume is selected as the migration-destination volume, there is a lot of free area, which is not used, and this constitutes waste. If the size (Vmax) falls with the range of V1 through MS, a volume of this size Vmax should have been detected in S67. If it was not detected in S67, this means the size Vmax is larger than the size V1, and if it is selected as the migration-destination volume of a data migration, a lot of the storage area will go to waste.

Accordingly, the volume having the next largest size is retrieved once again (S73). By so doing, the management server 20 detects the volume having the maximum size Vmax less than the size MS (S72: NO), secures this Vmax (<MS) volume, and executes data migration (S74). Since the size Vmax of this secured volume is less than the migration target size MS, data migration cannot be completed using this volume alone.

The management server 20 computes the remaining capacity MS1, which did not undergo data migration, by subtracting Vmax from the migration target size MS (S75), substitutes this migration residual quantity MS1 as the MS (S76), and returns to S61. The remaining migration-targeted files, which were not migrated to the first migration-destination volume, will be moved to another volume.

However, for example, when the volumes 36, 37 of the storage device 30 have been used up, a maximum size Vmax volume cannot be detected (S70: NO). In this case, the management server 20 determines whether or not a storage device with the next highest precedence exists in the storage system (S77).

When a storage device with the next highest precedence exists (for example, storage device 40) (S77: YES), the management server 20 selects this storage device (S79), and repeats the above-mentioned S63 and subsequent steps. When a storage device with the next highest precedence does not exist in the storage system (S77: NO), the management server 20 carries out the prescribed error processing based on the migration execution policy 25H (S78).

The above has been the state of an initial data migration executed for a migration group. In an initial data migration, a migration-destination volume is sought in order from the high-precedence storage device. When there is no free volume of suitable size, the data of a migration group is divided up, and stored in a plurality of free volumes, respectively. When there are no longer any free volumes in the high-precedence storage device, another storage device is selected according to precedence.

Figure 19:
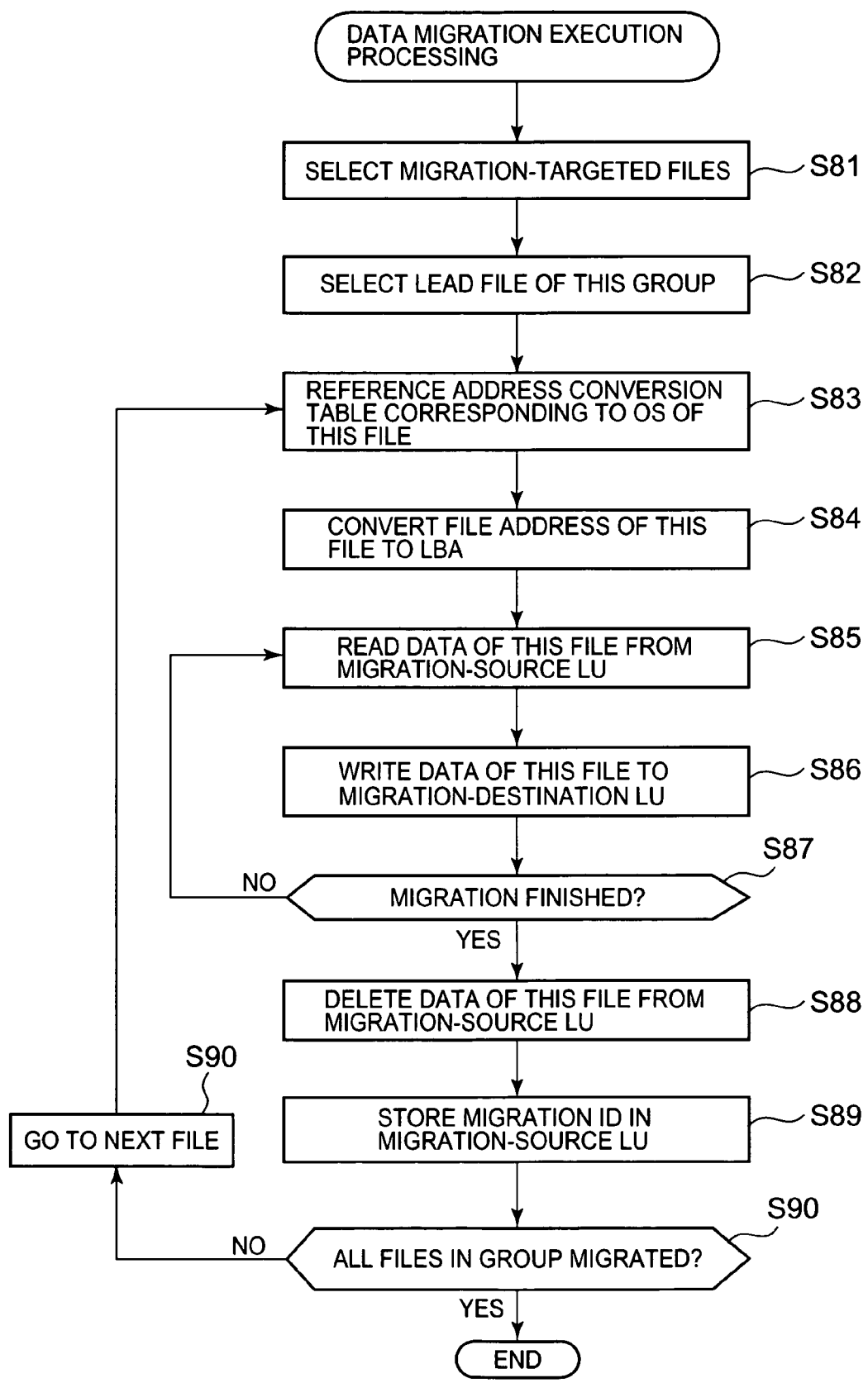
FIG. 19 is a flowchart showing data migration execution processing.

FIG. 19 is a flowchart showing data migration execution processing. This processing is executed subsequent to a migration-destination volume being secured.

First, the management server 20 selects a group targeted for migration (S81), and selects the lead file inside this group (S82). The management server 20 references the address conversion table 34F, which corresponds to this file (S83), and converts the file address of this file to a logical block address (LBA) (S84).

The management server 20 accesses the migration-source volume in which this file is stored, reads the file data (S85), and writes the read file data to the migration-destination volume (S86). Then, the management server 20 checks whether or not the migration of this file is finished (S87), and when migration is finished (S87: YES), it deletes this file from the migration-source volume (S88). Next, the management server 20 writes a migration ID to the migration-source volume (S89). The migration ID, for example, is stored at the head of the location where the migrated file had been stored.

The management server 20 determines if all the files in the migration group have been migrated (S90), and when unmigrated files exist (S90: NO), it proceeds to the next file (S91) and returns to S83. When all the files in the migration group have been migrated from the migration-source volume to the migration-destination volume, this processing ends normally.

Figure 20:
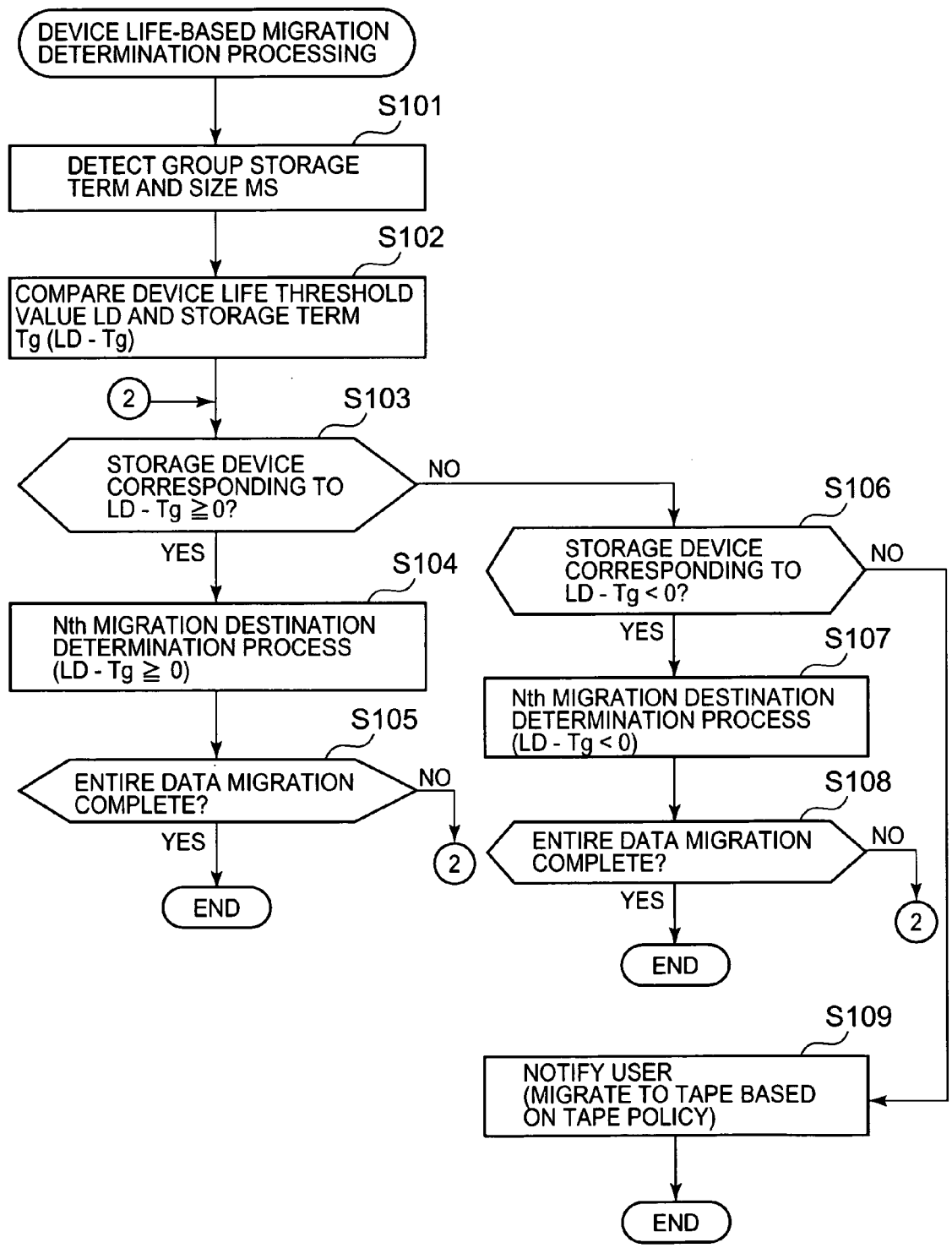
FIG. 20 is a flowchart showing migration destination determination processing based on device life.

FIG. 20 is a flowchart showing the processing for determining a data migration based on device life.

First, the management server 20 detects the storage term Tg and size MS, respectively, of a migration group (S101). Next, the management server 20 compares the device life threshold values LD of the respective storage devices 30, 40 against the storage term Tg of the migration group, and computes the differences between the two (LD−Tg) (S102).

Based on the results of these computations, the management server 20 determines whether or not there is a storage device that satisfies the formula LD−Tg≧0 (S103). That is, it determines if there is a storage device for which the threshold value of the device life LD is longer than the migration group storage term Tg.

When it detects a storage device which has a device life threshold value LD that is longer than the storage term Tg (S103: YES), the management server 20 executes "Nth migration destination determination processing (LD−Tg≧0)" (S104). This processing will be explained in detail below. Then, the management server 20 determines if all data migration is complete (S105), and when it is complete (S105: YES), it ends this processing normally. When not all data migration has been completed (S105: NO), it returns to S103. For example, when a storage device with a long life does not comprise adequate free volumes, an entire migration group cannot be migrated to this long-life storage device, causing the management server 20 to return to S103, and search for another storage device.

The management server 20 determines if there is another storage device that satisfies the formula LD−Tg≧0 (S103). When another long-life storage device is detected (S103: YES), the management server 20 repeats the above-mentioned S104, S105.

When there is no storage device, which satisfies the formula LD−Tg≧0 (S103: NO), the management server 20 determines if a storage device that satisfies the formula LD−Tg<0 exists in the storage system (S106). That is, the management server 20 searches for a storage device comprising a device life threshold value LD that is shorter that the migration group's storage term Tg. When a storage device that satisfies the formula LD−Tg<0 is detected (S106: YES), the management server 20 executes the "Nth migration destination determination processing (LD−Tg<0)" (S107). Then, the management server 20 determines if all data migration is complete (S108), and when it is not complete (S108: NO), the management server 20 returns to S103.

Conversely, when a storage device that satisfies the formula LD−Tg<0 does not exist (S106: NO), data migration to a storage device cannot be carried out. Accordingly, the management server 20 either issues a warning to the user, or migrates the migration group to the tape device 50 on the basis of the tape policy 25G (S109).

Figure 21:
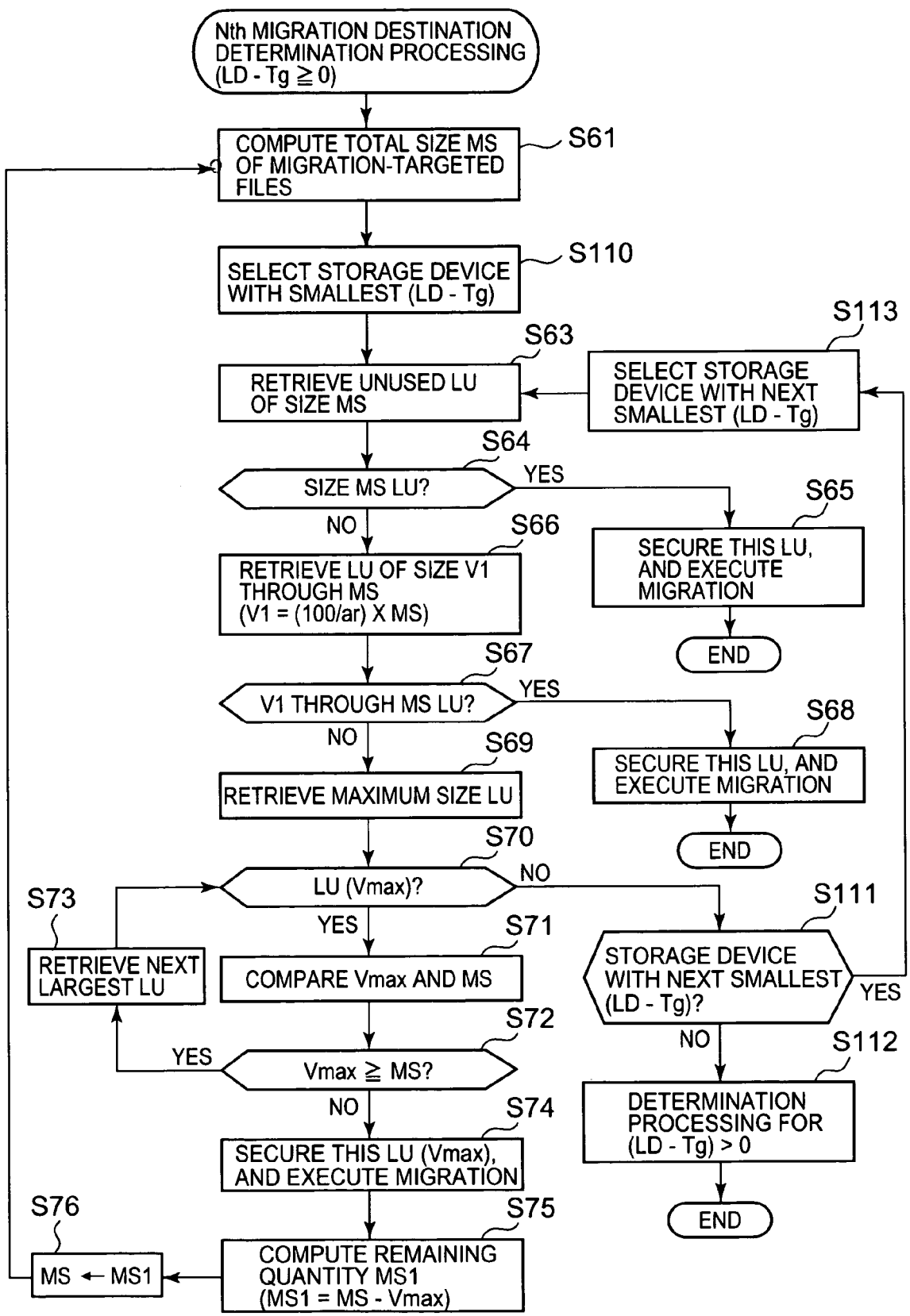
FIG. 21 is a flowchart showing migration destination determination processing for a second and subsequent migration, when the device life threshold value is longer than the storage term of a migration group.

FIG. 21 is a flowchart showing the details of S104 in FIG. 20. Nth migration signifies data migrations, which are carried out for the second and subsequent migrations.

The flowchart shown in FIG. 21 is utilized when the storage device life threshold value LD is greater that the storage term Tg of the migration group (LD−Tg≧0). This flowchart comprises steps in common with those of the flowchart described together with FIG. 18. These common steps share the same reference numerals, and explanations thereof will be omitted.

The explanation will focus on the points of difference with FIG. 18. The management server 20 initially selects a storage device with the smallest (LD−Tg) value (S110). The smallest (LD−Tg) value means that the difference between the device life threshold value LD and the storage term Tg is near 0, and the migration group storage term Tg approximately coincides with the device life threshold value LD of the storage device. It should be noted that, whereas a high-precedence storage device is selected in the flowchart shown in FIG. 18 (S62), in the flowchart shown in FIG. 21, a storage device, for which the difference between the device life threshold value LD and storage term Tg is small, is selected.

Therefore, when there are no more free volumes in the storage device with the smallest (LD−Tg) value (S70: NO), the management server 20 searches to determine if there is another storage device with the next smallest (LD−Tg) value (S111). When another storage device is detected (S111: YES), the management server 20 selects this storage device (S113), and returns to S63.

If a storage device with the smallest (LD−Tg) value does not exist (S111: NO), that is, when there is no storage device comprising a device life threshold value LD, which is equal to or greater than the migration group storage term Tg, the management server 20 moves to processing for determining when (LD−Tg)>0 (S112).

Figure 22:
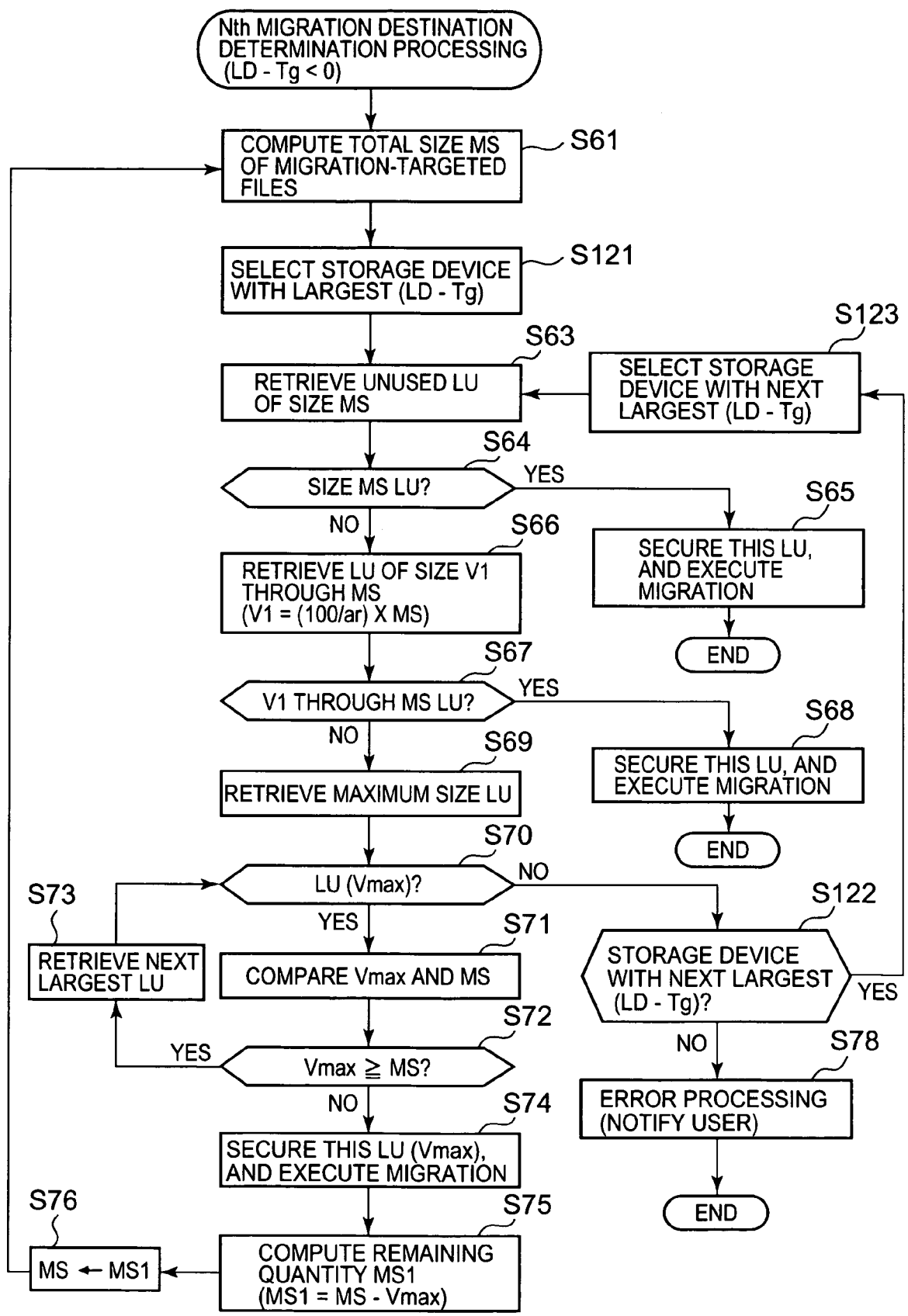
FIG. 22 is a flowchart showing migration destination determination processing for a second and subsequent migration, when the device life threshold value is shorter than the storage term of a migration group.

FIG. 22 is a flowchart showing the details of S107 in FIG. 20. Since this flowchart also comprises steps in common with those of the flowchart shown in FIG. 18, explanations of the common parts will be omitted, and the explanation will focus on the points of difference.

In this processing, the management server 20 selects the storage device with the largest (LD−Tg) value (S121). That is, in this processing, the difference between the migration group storage term Tg and the device life threshold value LD constitutes a negative value, and the storage device with the smallest negative value is selected. In other words, the management server 20 initially selects the storage server for which the difference between Tg and LD is smaller.

Then, when there are no more free volumes in the initially selected storage device (S70: NO), the management server 20 searches for the next storage device (S122). When the management server 20 detects the next storage device (S122: YES), it selects this storage device (S123) and returns to S63.

If the next storage device cannot be detected (S122: NO), the management server 20 carries out error processing, such as issuing a warning to the user (S78).

The above is details of a second and subsequent data migrations based on the life of a storage device. As explained above, the management server 20 places priority on using a storage device, which has a device life threshold value LD that is longer than the storage term Tg of the migration group, and when the free volumes in this long-life storage device are used up, it selects and uses a storage device with as long a life as possible.

Figure 23:
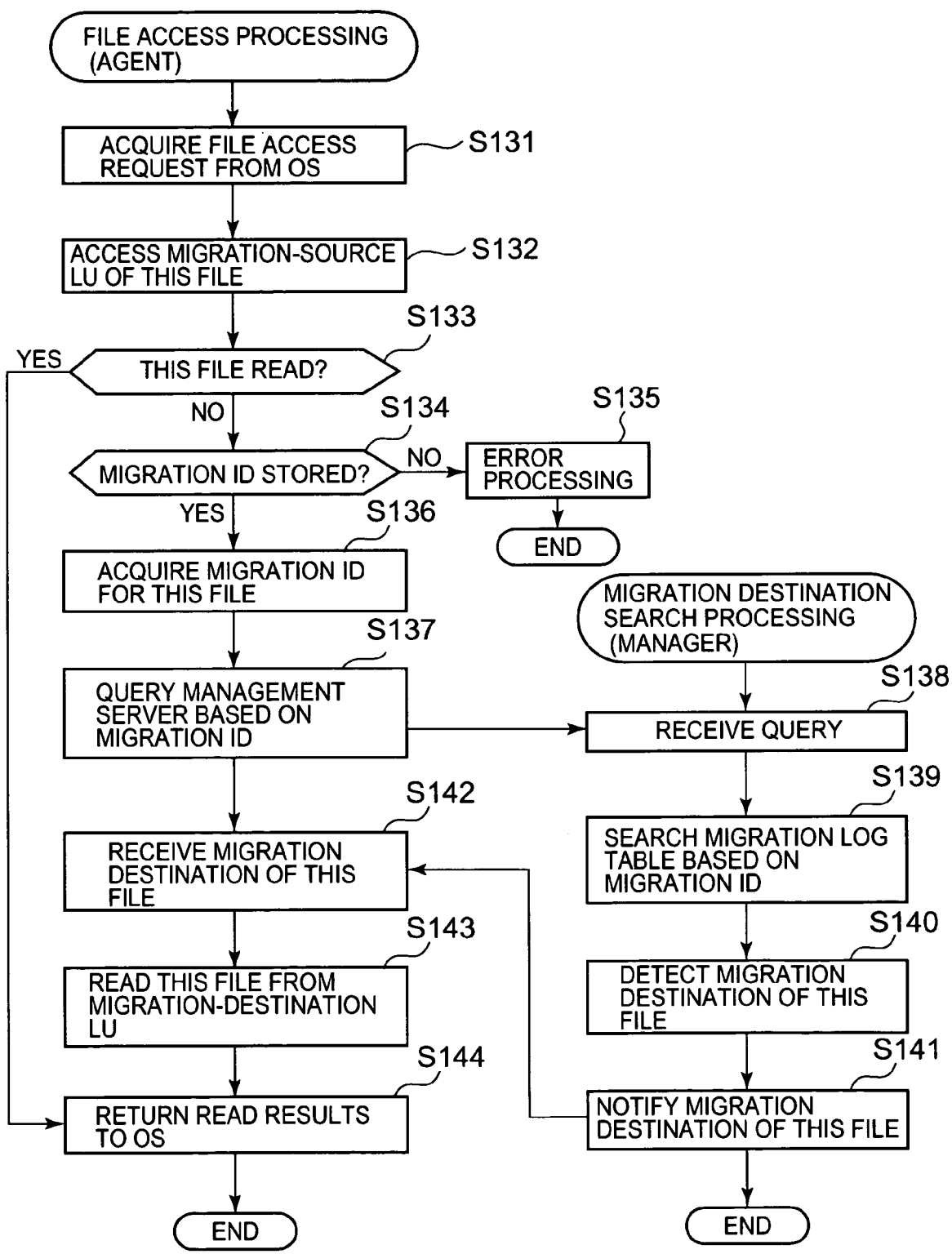
FIG. 23 is a flowchart showing processing for accessing a file.

FIG. 23 is a flowchart showing file access processing executed by an agent program 17. An agent program 17 not only collects file information, but also processes file access requests transferred from an application program via the OS. Here, file access request signifies read access.

When an agent program 17 receives a file access request from the OS (S131), it accesses the volume in which this file is stored (S132).

Here, when the file access request from the OS is a write access, the agent program 17 returns a write-prohibited status. That is, the agent program 17 only permits read access to a volume, which has undergone migration. Permitting only read access to a migration volume, while prohibiting write access is done to prevent an increase in volume capacity resulting from the writing of data, and to prevent volume tampering. Furthermore, it is also possible to use a constitution that permits write access; the present invention is not limited to a constitution, which only permits read access to a migration volume.

When a file access request from the OS is a read access, the agent program 17 accesses the requested volume (S132), and when it reads the desired file from the access-destination volume (S133: YES), the agent program 17 returns the read results to the OS (S144). In other words, when the access-targeted file has not been migrated yet, the agent program 17 can immediately read data from the volume in which this file is stored, and deliver it to the OS.

Next, a case in which an access-targeted volume has already been migrated will be explained. In this case, even if an agent program 17 accesses the volume, it cannot read the file data (S133: NO) because the file data does not exist there anymore.

Instead of the access-targeted file, the agent program 17 determines whether or not the migration ID was read (S134). When the migration ID cannot be read (S134: NO), there is a chance that a communications or drive malfunction has occurred, and therefore the agent program 17 carries out error processing (S135). In this error processing, for example, notification is made to the OS to the effect that access to the file failed.

When a migration ID is stored instead of the object file (S134: YES), the agent program 17 acquires this migration ID (S136), specifies this migration ID, and queries the manager program 26 of the management server 20 as to the location of the file (S137).

When the manager program 26 receives the query request from the agent program 17 (S138), it searches the migration log table 34E on the basis of the specified migration ID (S139). When the manager program 26 detects the migration destination of the file (S140), it notifies the agent program 17 of the location of this file (S141).

When the agent program 17 receives the reply from the manager program 26 regarding the migration destination of the access-targeted file (S142), it accesses the prescribed address of the migration-destination volume, and reads the data of the file (S143), and returns the read results to the OS (S144).

The management server 20 uniformly manages the locations of files before and after data migration in this manner, and migration IDs for learning the migration destinations of files are stored in the migration-source volume. Therefore, an agent program 17 can access a file that has been targeted by querying the management server 20 based on a migration ID no matter where inside the storage system a file has been migrated.

Figure 24:
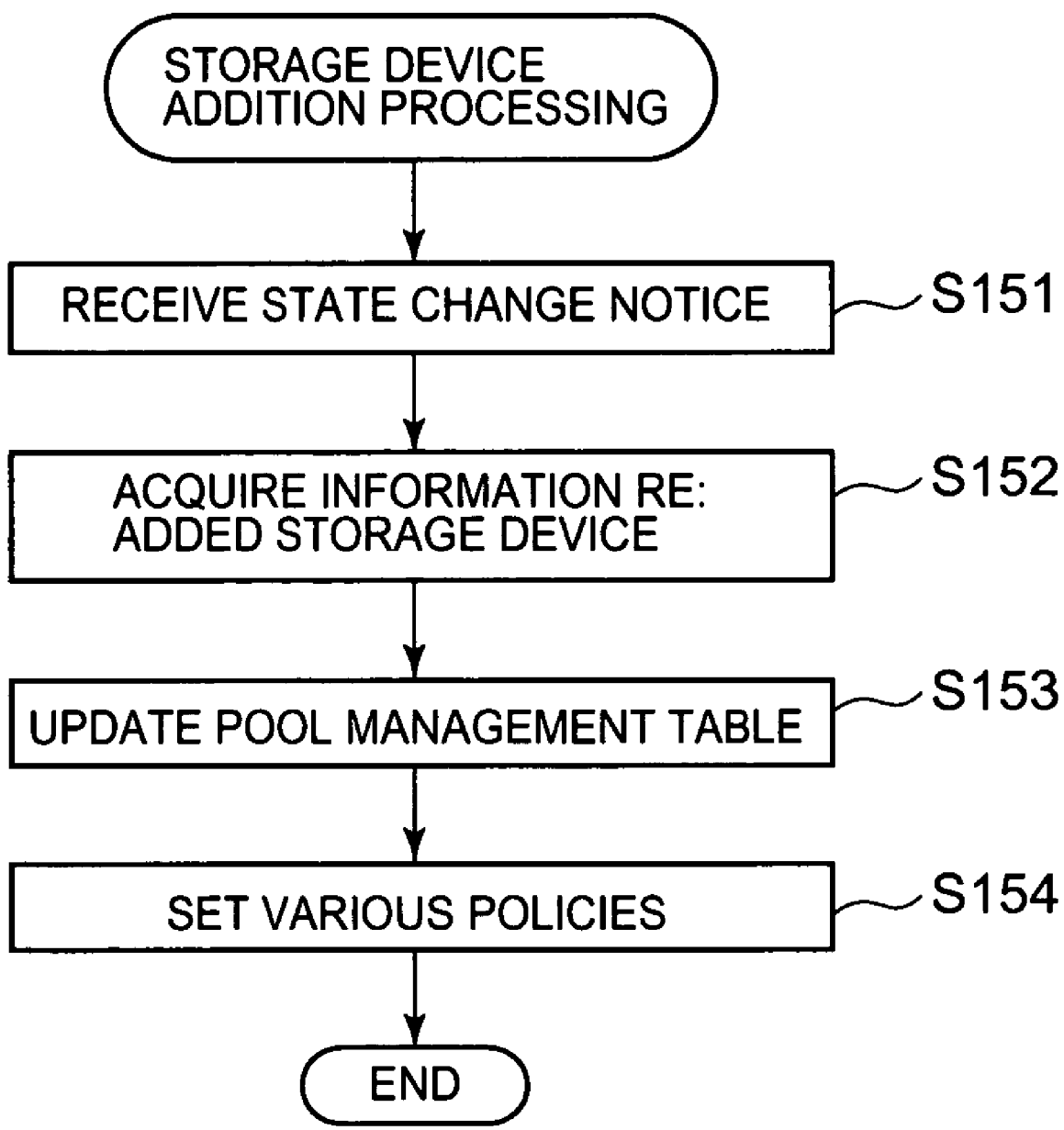
FIG. 24 is a flowchart showing processing for adding a storage device to a storage system.

FIG. 24 is a flowchart showing the processing when a storage device is added to the storage system. When a storage device is added to the storage system, a notification notifying a state change is issued from either the added storage device, or the switch 60 connected to this added storage device.

For example, when the constitution of the storage system changes, a state change notification, such as a RSCN (Registered State Change Notification) or LIP (Loop Initialization Primitive), is issued from the source of the change. Inside the same sub-network, the occurrence of a state change is notified via a LIP to other nodes belonging to this sub-network, respectively. A state change that occurs in another sub-network is notified via a RSCN. Furthermore, in addition to these, for example, SCR (State Change Registration) and SCN (State Change Notification) are also known.

When the management server 20 receives a state change notification (S151), it accesses the added storage device, acquires the LU number, LU size and other such information (S152), and based on this acquired information, updates the pool management table 34A (S153). Next, when a user accesses the management server 20 and registers various policies (S154), it becomes possible to use this added storage device in a data migration.

Figure 25:
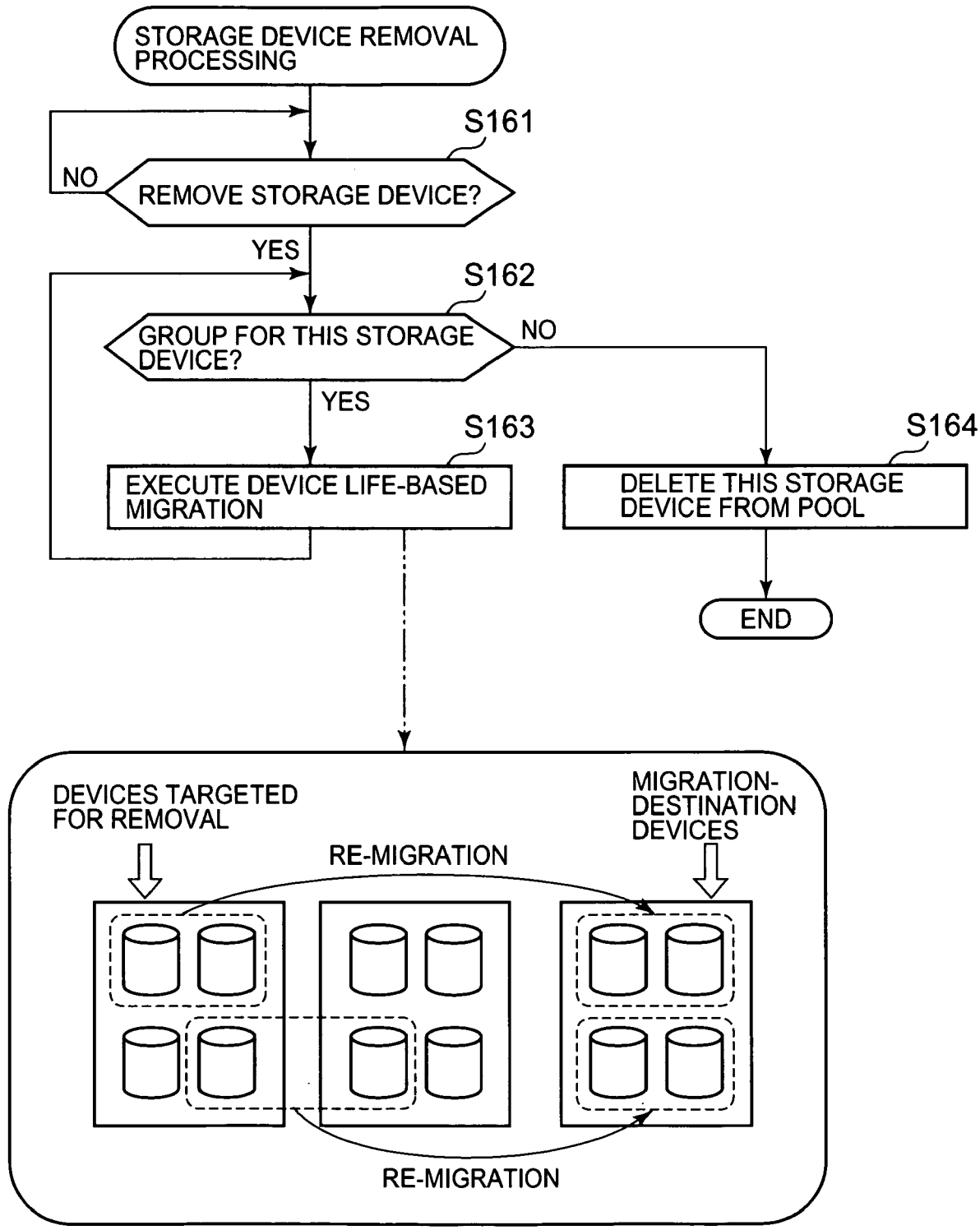
FIG. 25 is a flowchart showing processing for deleting a storage device from a storage system.

FIG. 25 is a flowchart showing processing for removing a storage device from the storage system. When a storage device is to be removed, the user makes an input to the management server 20 to the effect that the storage device will be removed.

When a storage device is to be removed from the storage system (S161: YES), the management server 20 determines whether or not a migration group exists inside the storage device targeted for removal (S162). When a migration group exists inside the storage device targeted for removal (S162: YES), the management server 20 executes a data migration using the above-mentioned device life as a trigger (S163).

When the migration group of the storage device targeted for removal is to be migrated to another storage device (S162: YES), the management server 20 deletes the storage device targeted for removal from the pool in the migration management database 34, and notifies the user to the effect that he has permission to remove the storage device (S164).

Because this embodiment is constituted as described hereinabove, it exhibits the following effects. In this embodiment, the constitution is such that a plurality of types of files, the storage time limits of which arrive within a prescribed time period, are collected together into a single migration group, and data migration is carried out en masse. Therefore, the data migration of a plurality of types of files can be collectively managed with a more moderate range of storage terms, thereby enhancing usability.

In this embodiment, the constitution is such that the initial data migration of a migration group is carried out based on the precedence of a storage device, and the next data migration related to the same migration group is carried out taking into account the life of a storage device. Therefore, in the initial data migration, a migration group is moved to a relatively high-performance storage device, and can be readied for reuse by the server 10, and in the second and subsequent data migrations, it is possible to use a storage device, which corresponds to the storage term of the migration group. This makes it possible to effectively utilize the storage resources of a storage system, and also enhances usability.

In this embodiment, the constitution is such that data migration can be carried out between storage devices while taking into account the life of the storage devices. Therefore, files, which must be stored for a long period of time, can be stored inside a storage system, the constitution of which changes with the passage of time, thus enhancing usability.

In this embodiment, the constitution is such that, after a data migration, a migrated file is deleted from the migration-source volume, and a migration ID is left in its place, and the management server 20 uniformly manages a log of data migrations based on the migration IDs. Therefore, the amount of information for determining the location of a migrated file can be reduced, the storage resources of the migration-source volume can be effectively utilized, and the migrated files can be easily accessed.

In this embodiment, the constitution is such that storage devices with the longest possible device life are selected in the second and subsequent data migrations. Therefore, it is possible to reduce the frequency of data migrations, and to lessen the load on the storage system.

2. Second Embodiment

A second embodiment of the present invention will be explained based on FIG. 26. This embodiment is equivalent to a variation of the above-mentioned first embodiment, and the explanation given for the first embodiment will be appropriately cited. In this embodiment, information for managing a data migration is distributed and stored in prescribed locations of the volumes in which respective migration groups are stored.

Figure 26:
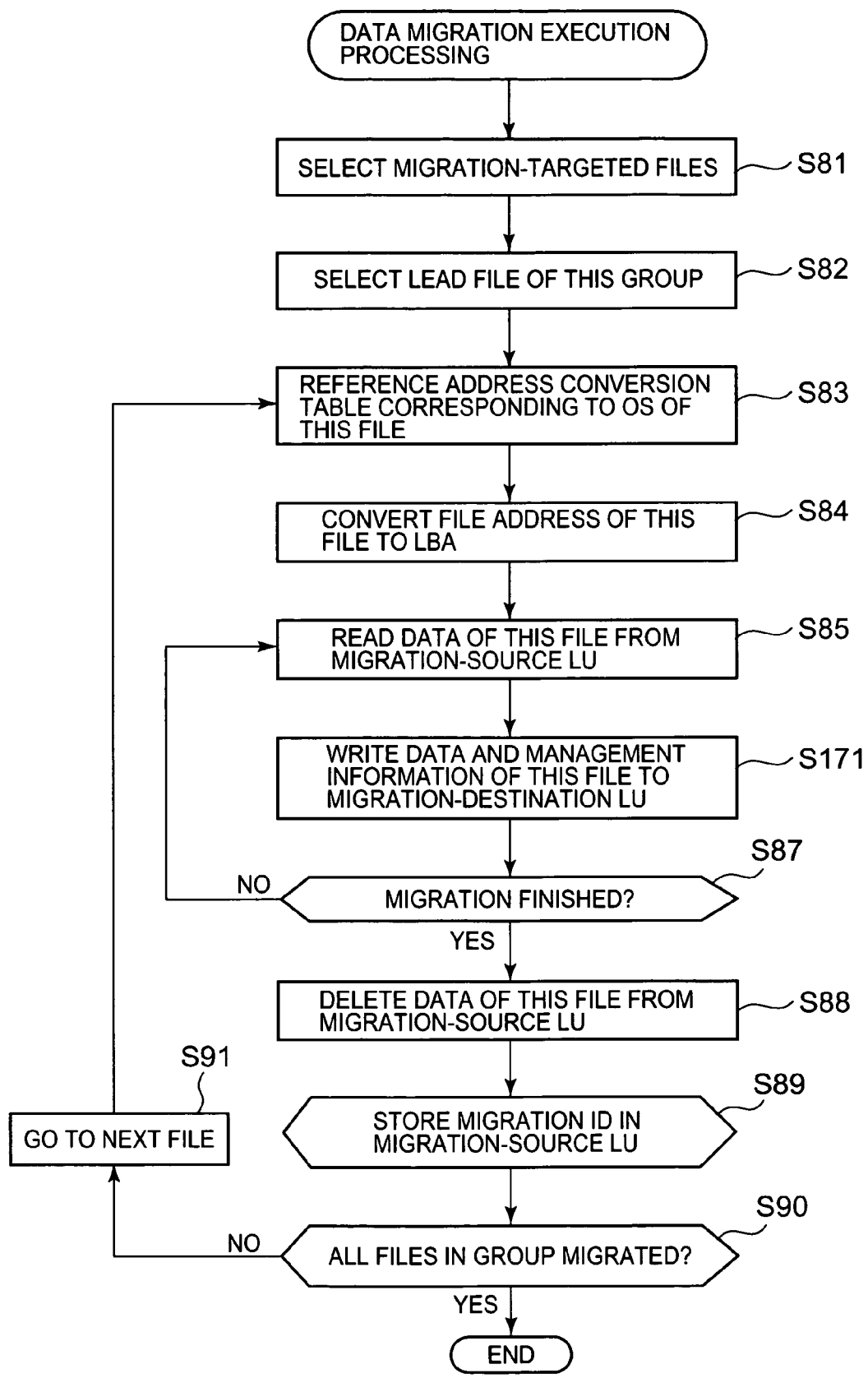
FIG. 26 is a flowchart showing the data migration execution processing used in a second embodiment of the present invention.

FIG. 26 is a flowchart showing the data migration execution processing of this embodiment, and comprises steps in common with those of the flowchart shown in FIG. 19 explained above. The explanation will omit the common parts, and focus on the points of difference. Thus, the management server 20 reads migration-targeted files from the migration-source volume (S85), after which, it stores the data and management information of these files in a migration-destination volume (S171).

As this management information, it is possible to cite information used for specifying files, information used for specifying the migration group, and information used for specifying policies.

As information used for specifying files, for example, the storage terms of the respective files, file sizes, migration IDs and so forth can be cited. As information used for specifying the migration group, for example, it is possible to cite the migration group storage term, the number and size of the volume, which will constitute the migration group, the ID of the storage device in which the volume resides, and the migration log. As information used for specifying policies, for example, it is possible to cite information indicating the policies on which the execution of a data migration was based.

Figure 27:
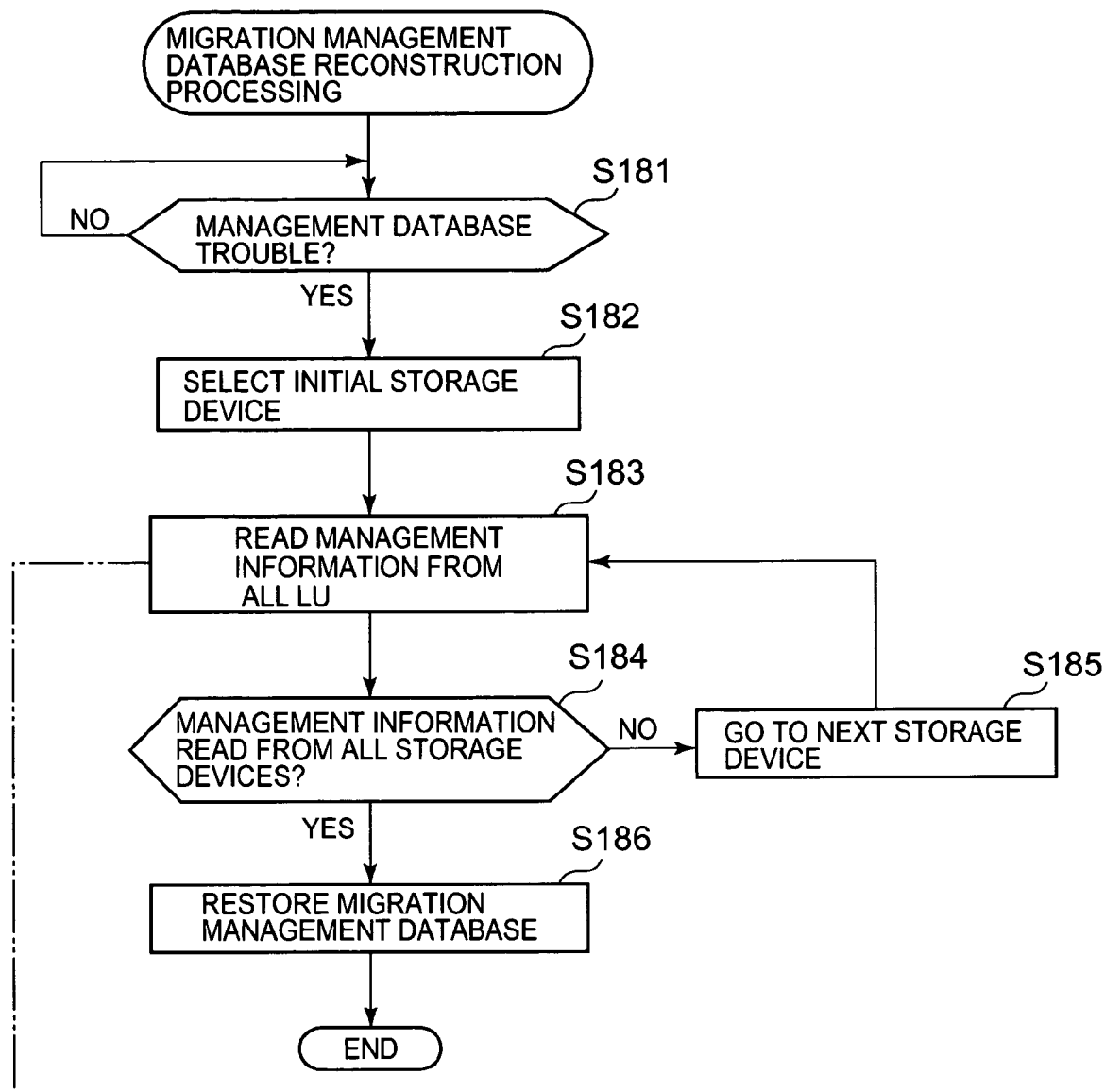
FIG. 27 is a flowchart showing processing for restoring a migration management database.

The management information, as shown in the bottom of FIG. 27, can be stored in a prescribed location of a volume. The management information is stored in the same address of the respective volumes.

FIG. 27 is a flowchart showing the processing for reconstructing the migration management database 34 when it is impaired. When the management server 20 detects that trouble has occurred in the migration management database 34 (S181: YES), it selects the initial storage device in the storage system (for example, by ID order) (S182), accesses the prescribed address in all of the volumes, and reads out the respective management information (S183).

Until the management information from all the volumes in all the storage devices has been read (S184: NO), the management server 20 collects management information (S183) by switching from one storage device to another (S185).

When all of the respective management information distributed among the volumes has been acquired (S184: YES), the management server 20 restores the migration management database 34 (S186).

Furthermore, this explanation was premised on the respective management information of all the volumes in all the storage devices being read, but it is not necessary to access storage devices and volumes in which management information is clearly not provided.

This thus-constituted embodiment exhibits the same effects as the above-mentioned first embodiment. In addition to this, because the management information is distributed and arranged in the respective volumes, even when the migration management database 34 is impaired, the migration management database 34 can be restored. Therefore, in a storage system that changes over time, long-term data migrations that span storage devices can be executed highly reliably.

Furthermore, the present invention is not limited to the above-mentioned embodiments. A person having ordinary skill in the art will be able to make various additions and changes within the scope of the present invention. For example, a constitution, in which a plurality of management servers is operated in concert, can also be used.

What is claimed is:

1. A storage system comprising at least one or more host devices, a plurality of storage devices for providing volumes to said host device, and a management device, which is connected to said host device and said storage devices, respectively, wherein (1) said host device comprises:

(1A) an application program, which uses said volumes; and (1B) a file access controller, which, based on a file access request from said application program, acquires files from a prescribed volume, and acquires file information related to the files utilized by said host device from the volumes of said respective storage devices, and (2) said management device comprises:

(2A) a migration management database for managing information related to a data migration;

(2B) a policy database for managing policies related to said data migration;

(2C) a file information acquisition portion, which receives the respective said file information collected by said file access controller;

(2D) a migration manager for controlling the execution of said data migration; and (2E) a storage controller for causing said storage devices to migrate the files of said volumes, and (3) the connection-source storage device of said storage devices, comprises:

(3A) volumes, which are provided to said host device;

(3B) virtual volumes, which are connected to said volumes; and (3C) a mapping table for mapping the storage space of the volumes of connection-destination storage devices of said storage devices to the storage space of: said virtual volume, and (4) said management device executes the steps of:

(4A) extracting, based on said file information acquired respectively via said file information acquisition portion and the storage contents of said policy database, data migration-targeted files from among the plurality of files distributed and stored in said respective volumes;

(4B) generating, based on the storage time limits of said extracted files and a prescribed time period registered in said policy database, a migration group by grouping the files for which said prescribed time period comprises said storage time limit;

(4C) matching the expiry of said migration group to the term of the file having the most distant storage time limit in future from among the respective files comprising said migration group;

(4D) determining, via said migration manager, a migration-destination volume of said migration group based on said policy database and said migration management database;

(4E) reading, via said migration manager, said respective files belonging to said migration group from the migration-source volumes and storing same in said migration-destination volume;

(4F) deleting said migrated files from said migration-source volumes, and storing migration destination detection information for detecting the migration destination of said respective files in the migration-source volumes at the locations from which said respective files were deleted; and (4G) replying to said file access controller, when a query disclosing said migration destination detection information is made from said file access controller, with the location of the files related to said query, based on said migration-destination detection information and the storage contents of said migration management database.

* * * * *